(12) United States Patent
Fujimoto et al.

(10) Patent No.: US 7,776,429 B2
(45) Date of Patent: Aug. 17, 2010

(54) SUPPORT FOR IMAGE RECORDING MATERIAL, IMAGE RECORDING MATERIAL, AND IMAGE RECORDING METHOD

(75) Inventors: Shinji Fujimoto, Shizuoka (JP); Kazuhito Miyake, Shizuoka (JP); Ashita Murai, Shizuoka (JP); Ryuichi Katsumoto, Shizuoka (JP); Shigehisa Tamagawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 228 days.

(21) Appl. No.: 11/664,113

(22) PCT Filed: Sep. 29, 2005

(86) PCT No.: PCT/JP2005/018039

§ 371 (c)(1),
(2), (4) Date: Dec. 19, 2007

(87) PCT Pub. No.: WO2006/038537

PCT Pub. Date: Apr. 13, 2006

(65) Prior Publication Data

US 2008/0108501 A1    May 8, 2008

(30) Foreign Application Priority Data

Oct. 5, 2004    (JP) .............................. 2004-292948

(51) Int. Cl.
*B32B 7/02* (2006.01)

(52) U.S. Cl. .................... 428/213; 428/195.1; 428/218; 428/335; 428/500; 428/537.7

(58) Field of Classification Search .............. 428/195.1, 428/537.7, 213, 218, 335, 500
See application file for complete search history.

(56) References Cited

U.S. PATENT DOCUMENTS

| 6,335,102 | B1 * | 1/2002 | Tsubaki et al. .............. 428/513 |
| 6,656,572 | B2 * | 12/2003 | Steinbeck et al. ......... 428/195.1 |
| 2001/0021442 | A1 * | 9/2001 | Steinbeck et al. ........... 428/195 |
| 2002/0064672 | A1 * | 5/2002 | Tsubaki et al. .............. 428/535 |

FOREIGN PATENT DOCUMENTS

| JP | 4-293042 A | 10/1992 |
| JP | 7-120868 A | 5/1995 |
| JP | 9-146218 A | 6/1997 |
| JP | 2000-10327 A | 1/2000 |
| JP | 2004-3078 A | 1/2004 |
| JP | 2004-114447 A | 4/2004 |

* cited by examiner

*Primary Examiner*—Betelhem Shewareged
(74) *Attorney, Agent, or Firm*—Sughrue Mion, PLLC

(57) ABSTRACT

An object of the present invention is to provide a support for image recording material, which can record high quality images without causing blister, unevenness of recording and unevenness of fixation; various image recording materials using the support for image recording material; and an image recording method. Therefore, the present invention provides a support for image recording material, comprising a base paper and at least one polyolefin resin layer formed on both surfaces of the base paper, wherein a front surface polyolefin resin layer at the side of the polyolefin resin layer, on which an image recording layer is formed, is composed of two or more layers, and an average density of an outermost front surface polyolefin resin layer, which is located farthest from the base paper, is less than that of at least any front surface polyolefin resin layers other than the outermost front surface polyolefin resin layer.

3 Claims, 3 Drawing Sheets

F I G. 1
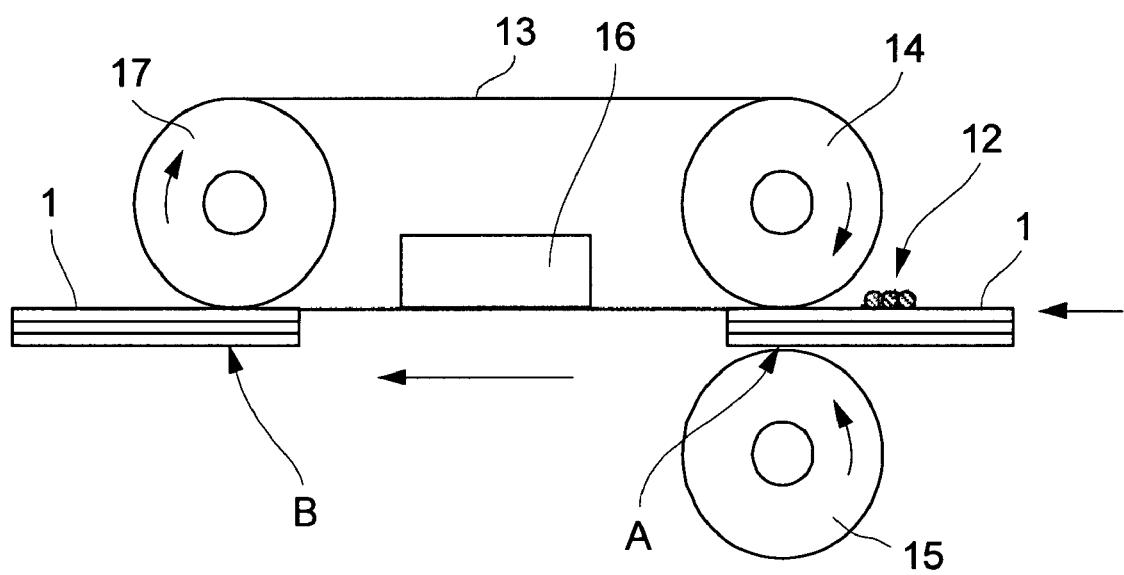

SUPPORT FOR IMAGE RECORDING MATERIAL, IMAGE RECORDING MATERIAL, AND IMAGE RECORDING METHOD

TECHNICAL FIELD

The present invention relates to a support for image recording material, which can record high quality images without causing blister, unevenness of recording and unevenness of fixation; an image recording material that employs the support for image recording material; and an image recording method.

BACKGROUND ART

Various supports, e.g. base paper, synthetic paper, synthetic resin sheet, coated paper and laminated paper, have been utilized for wide variety of image recording materials such as electrophotographic materials, thermosensitive materials, inkjet recording materials, sublimation transfer materials, heat-developable materials, silver salt photographic materials and thermal transfer materials. Among these, coated paper and laminated paper have been favorably utilized.

As the support for image recording material, for example, there are proposed those comprising a base paper and at least one resin coating layer formed on both surfaces of the base paper (see Patent Literature Nos. 1 to 3).

However, when these supports for image recording material are used in electrophotographic materials, thermosensitive materials, and various heat transfer recording materials, since any step in image recording includes the step of heating at high temperature, problems such as bubble-like defects (blister) in a resin coating layer are caused by a gas such as steam generated from a base paper. When a material having high heat resistance is used in the resin coating layer of the support for image recording material, problems such as unevenness of recording and unevenness of fixation are caused by poor conformability.

Therefore, there has never been obtained a support for image recording material comprising a base paper and at least one polyolefin resin layer formed on both surfaces of the base paper, which can record high quality images without causing blister, unevenness of recording and unevenness of fixation, and thus it is now required to provide such a support.

Patent Literature 1: Japanese Patent Application Laid-Open JP-A) No. 07-120868

Patent Literature 2: JP-A No. 09-146218

Patent Literature 3: JP-A No. 2000-10327

DISCLOSURE OF THE INVENTION

It is an object of the present invention is to provide a support for image recording material, which can record high quality images without causing blister, unevenness of recording and unevenness of fixation; various image recording materials that employ the support for image recording material; and an image recording method.

The above object may be achieved by the present invention as follows:

<1> A support for image recording material, comprising:
a base paper, and
at least one polyolefin resin layer on each of both surfaces of the base paper,
wherein two or more of polyolefin resin layers are disposed at the front side of the support on which an image recording layer is to be formed, and
the average density of the outermost polyolefin resin layer at the front side is less than an average density of at least one of the two or more of polyolefin resin layers except for the outermost polyolefin resin layer.

<2> The support for image recording material described in <1>, applied for image recording by way of heat-recording, heat-development, or heat-fixation.

<3> The support for image recording material described in <1> or <2>, wherein the average density of the outermost polyolefin resin layer at the front side is less than 0.930 g/cm$^3$ and the average density of at least one of the two or more of polyolefin resin layers except for the outermost polyolefin resin layer is 0.930 g/cm$^3$ or more.

<4> The support for image recording material described in any one of <1> to <3>, wherein the thickness of at least one of the two or more of polyolefin resin layers except for the outermost polyolefin resin layer is 15 μm or more.

<5> The support for image recording material described in any one of <1> to <4>, wherein the outermost polyolefin resin layer at the front side contains a low density polyethylene having a density of 0.930 g/cm$^3$ or less and at least one of the two or more of polyolefin resin layers except for the outermost polyolefin resin layer contains a high density polyethylene resin having a density of 0.945 g/cm$^3$ or more.

<6> The support for image recording material described in <5>, wherein the content of the high density polyethylene resin having a density of 0.945 g/cm$^3$ or more is 30% by mass or more in at least one of the two or more of polyolefin resin layers except for the outermost polyolefin resin layer.

<7> The support for image recording material described in any one of <1> to <6>, wherein at least one of the two or more of polyolefin resin layers contains an organic pigment or an inorganic pigment.

<8> An image recording material, comprising the support for image recording material described in any one of <1> to <7>, and an image recording layer formed on the support.

<9> The image recording material described in <8>, which is subjected to at least one of heat-recording, heat-development, and heat-fixation.

<10> The image recording material described in <8> or <9>, selected from electrophotographic materials, thermosensitive materials, sublimation transfer materials, thermal transfer materials, heat-developable materials, silver salt photographic materials, and inkjet recording materials.

<11> An image forming method, which comprises an image recording step of recording an image by way of heating a thermosensitive recording material, using a thermal head or a laser, that comprises a thermosensitive recording layer formed on a support for image recording material described in any one of <1> to <7>.

<12> An image forming method, which comprises a latent image recording step of recording a latent image by printing-exposure of a heat-developable material that comprises a thermosensitive recording layer formed on a support for image recording material described in any one of <1> to <7>, and
a heat-developing step of forming a visual image on the print-exposed heat-developable material by heating using one of heating rollers, heating belts, plate heaters, thermal heads, lasers and combinations thereof.

<13> An image forming method, which comprises a toner image forming step of forming a toner image on an electrophotographic material that comprises a toner receiving layer formed on a support for image recording material described in any one of <1> to <7>, and a heat-fixing step of fixing the toner image by heating using one of fixing rollers, fixing belts and combinations thereof.

<14> An image forming method, which comprises a toner image forming step of forming a toner image on an electrophotographic material that comprises a toner receiving layer formed on a support for image recording material described in any one of <1> to <7>, and an image surface smoothing/fixing step of smoothing the surface of the toner image.

<15> The image forming method described in <14>, wherein in the image surface smoothing/fixing step, a toner image is heated, pressurized, cooled and released using a device for image surface smoothing/fixing treatment, equipped with a heating/pressurizing member, a belt member and a cooling device.

<16> The image forming method described in <15>, wherein the belt member comprises a layer containing a fluorocarbonsiloxane rubber on the surface.

<17> The image forming method described in <15>, wherein the belt member comprises a layer containing a silicone rubber on the surface and the silicone rubber-containing layer comprises a layer containing a fluorocarbonsiloxane rubber.

<18> The image forming method described in <16> or <17>, wherein the fluorocarbonsiloxane rubber has at least a perfluoroalkylether group or a perfluoroalkyl group in the main chain.

The support for image recording material of the present invention comprises a base paper and at least one polyolefin resin layer formed on both surfaces of the base paper, a front surface polyolefin resin layer at the side of the polyolefin resin layer on which an image recording layer being composed of two or more layers, an average density of an outermost front surface polyolefin resin layer which is located farthest from the base paper is less than that of at least any front surface polyolefin resin layers other than the outermost front surface polyolefin resin layer, and thus it is possible to record high quality images without causing unevenness of recording and unevenness of fixation.

In the image recording material of the present invention, by using the support for image recording material of the present invention, it is possible to provide an image recording material which can record high quality images without causing blister, unevenness of recording and unevenness of fixation, and is particularly suited for any one of electrophotographic materials, thermosensitive materials, sublimation transfer materials, thermal transfer materials, heat-developable materials, silver salt photographic materials and inkjet recording materials.

The image recording method of the present invention comprises, in a first mode, an image recording step of recording images by heating a thermosensitive recording material comprising the support for image recording material of the present invention and at least a thermosensitive recording layer formed on the support using a thermal head or laser. Thus, it is possible to record high quality images without causing unevenness of recording and unevenness of fixation.

The image recording method of the present invention comprises, in a second mode, a latent image recording step of recording latent images by printing exposure of a heat-developable material comprising the support for image recording material of the present invention and at least an image recording layer formed on the support, and a heat-developing step of forming visual images on the print-exposed heat-developable material by heating using any one of a heating roller, a heating belt, a plate heater, a thermal head, laser and a combination thereof. Thus, it is possible to record high quality images without causing blister, unevenness of recording and unevenness of fixation.

The image recording method of the present invention comprises, in a third mode, comprises a toner image forming step of forming toner images on an electrophotographic material comprising the support for image recording material of the present invention and at least a toner receiving layer, and a heat-fixing step of fixing the toner images by heating using any one of a fixing roller, a fixing belt and a combination thereof. Thus, it is possible to record high quality images without causing blister, unevenness of recording and unevenness of fixation.

The image recording method of the present invention comprises, in a fourth mode, a toner image forming step of forming toner images on an electrophotographic material comprising the support for image recording material of the present invention and at least a toner receiving layer formed on the support, and an image surface smoothing/fixing step of smoothing the surface of the toner images. Thus, it is possible to record high quality images without causing blister, unevenness of recording and unevenness of fixation.

BRIEF DESCRIPTION OF DRAWINGS

FIG. 1 is a schematic view showing an example of a device for image surface smoothing/fixing treatment of the present invention.

BEST MODE FOR CARRYING OUT THE INVENTION

Support for Image Recording Material

Figure 2:
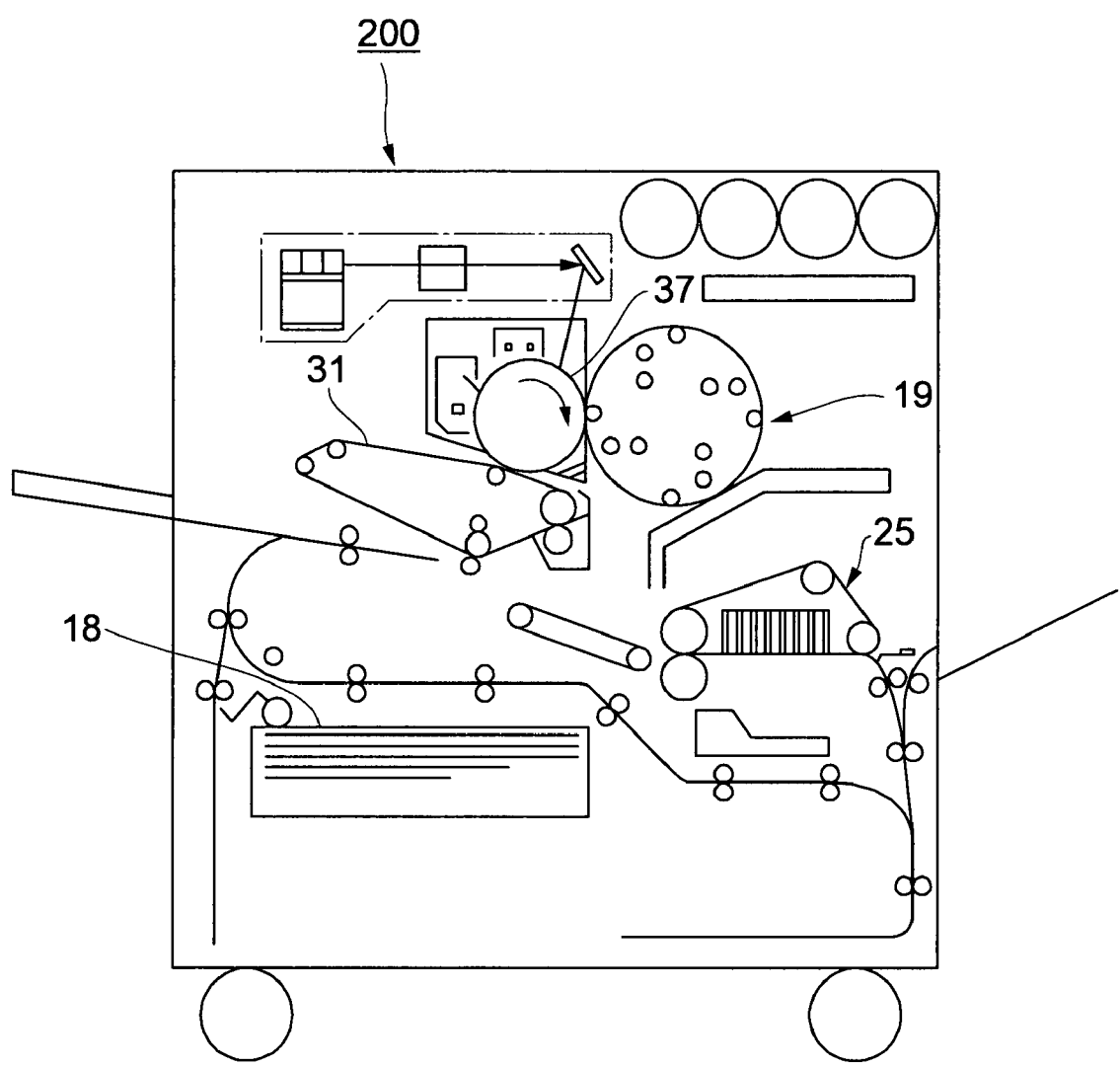
FIG. 2 is a schematic view showing an example of an image forming apparatus of the present invention.

The support for image recording material of the present invention comprises a base paper and at least one polyolefin resin layer formed on both surfaces of the base paper, a front surface polyolefin resin layer at the side, on which an image recording layer is formed, in the polyolefin resin layer being composed of two or more layer, the support further comprising, if necessary.

In this case, the support for image recording material is preferably used for image recording in which any one of recording by heating, development by heating and fixation by heating is performed.

Base Paper

The base paper may be appropriately selected according to the purposes, and specific examples of preferable base paper include wood free paper, for example, paper described in "Foundation of Photography-Silver Salt Photograph Edition", edited by Photographic Science and Technology, Japan, issued by Corona Publishing Co., Ltd. (1979), pp. 223-224.

In the raw paper, it is preferable to use pulp fibers having a fiber length distribution as disclosed, for example, in JP-A No. 58-68037 (for example, the sum of 24-mesh screen residue and 42-mesh screen residue is 20% by mass to 45% by mass, and 24-mesh screen residue is 5% by mass or less) in order to give the desired center line average roughness to the surface. Moreover, the center line average roughness can be adjusted by applying heat and pressure to a surface of the raw paper, with a machine calender, super calender, or the like.

The base paper may be a known material used as a support and be appropriately selected from various materials according to the purposes, and examples of the materials of the base paper include natural pulp made from needle-leaf trees and broadleaf trees, and a mixture of the natural pulp and a synthetic pulp.

Regarding pulps used as materials for the base paper, in view of good balance between surface flatness and smoothness of the raw paper, rigidity and dimensional stability (curl), broadleaf tree bleached kraft pulp (LBKP) is preferable. Needle-leaf bleached kraft pulp (NBKP) or broadleaf tree sulfite pulp (LBSP) can also be used.

A beater or a refiner can be used for beating the pulp.

Canadian standard freeness of the pulp is preferably 200 ml C.S.F to 440 ml C.S.F, and more preferably 250 ml C.S.F to 380 ml C.S.F, in view of controlling contraction of paper at a paper-making step.

Various additives, for example, fillers, dry paper reinforcers, sizing agents, wet paper reinforcers, fixing agents, pH regulators or other agents may be added, if necessary, to the pulp slurry (hereafter, may be referred to as pulp paper material) which is obtained after beating the pulp.

Examples of the fillers include calcium carbonate, clay, kaolin, china clay, talc, titanium oxide, diatomaceous earth, barium sulfate, aluminum hydroxide, magnesium hydroxide, baked clay, baked kaolin, delaminated kaolin, heavy calcium carbonate, precipitated calcium carbonate, magnesium carbonate, barium carbonate, zinc oxide, silicon oxide, amorphous silica, aluminum hydroxide, calcium hydroxide, zinc hydroxide, urea-formalin resin, polystyrene resin, phenol resin and fine hollow particles.

Examples of the dry paper reinforcers include cationized starch, cationized polyacrylamide, anionized polyacrylamide, amphoteric acrylamide and carboxyl-modified polyvinyl alcohol.

Examples of the sizing agents include higher fatty acid salt; styrene-acrylic compound, petroleum resin-based sizing agents; rosin, rosin derivative such as maleinated rosin, paraffin wax, alkyl ketene dimer, alkenylsuccinic anhydride (ASA), and a compound containing higher fatty acid such as epoxidated fatty acid amide.

Examples of the wet paper reinforcers include polyamine-polyamideepichlorohydrin, melamine resin, urea resin and epoxydated polyamide resin.

Examples of the fixing agents include various compounds, for example, polyhydric metal salt such as aluminum sulfate or aluminum chloride; basic aluminum compound such as sodium aluminate, basic aluminum chloride or basic polyaluminum hydroxide; polyhydric metal compound such as ferrous sulfate or ferric sulfate; water soluble polymer such as starch, modified starch, polyacrylamide, urea resin, melamine resin, epoxy resin, polyamide resin, polyamine resin, polyethyleneimine, vegetable gum or polyethylene oxide; cationic polymer such as cationized starch; hydrophilic crosslinked polymer particle dispersed substance, and derivatives or modified substances thereof.

Examples of the pH regulators include caustic soda and sodium carbonate.

Examples of the other agents include defoaming agents, dyes, slime control agents and fluorescent whitening agents.

Furthermore, softeners can be added, if necessary. As for the softeners, those disclosed on pp. 554-555 of Paper and Paper Treatment Manual (edited by Shiyaku Time Co., Ltd.) (1980) can be used.

These various additives may be used alone or in combination. The amount of these various additives to be added in the pulp furnish may be appropriately selected according to the purposes, and is preferably from 0.1 to 1.0% by mass.

If necessary, the pulp slurry is mixed with various additives to obtain a pulp furnish, followed by paper making using a paper machine such as handmade paper machine, Fortlinear machine, cylinder paper machine, twin wire machine or combination machine and further drying to obtain a base paper. If necessary, a surface sizing treatment can be carried out before or after drying.

The treating solution used in the surface sizing treatment may be appropriately selected according to the purposes and may contain, for example, water soluble polymer compounds, water resistant substances, pigments, dyes and fluorescent whitening agents.

Examples of the water soluble polymer compound include cationized starch, starch oxide, polyvinyl alcohol, carboxy-modified polyvinyl alcohol, carboxymethyl cellulose, hydroxyethyl cellulose, cellulose sulfate, gelatin, casein, sodium polyacrylate, styrene-maleic anhydride copolymer sodium salt and sodium polystyrenesulfonate.

Examples of the water resistant substance include latex emulsions such as styrene-butadiene copolymer, ethylene-vinyl acetate copolymer, polyethylene and vinylidene chloride copolymer; and polyamide polyamine epichlorohydrin and synthetic wax.

Examples of the pigment include calcium carbonate, clay, kaolin, talc, barium sulfate and titanium oxide.

As for the above-mentioned base paper, to improve the rigidity and dimensional stability (curl), it is preferable that the ratio (Ea/Eb) of the longitudinal Young's modulus (Ea) and the lateral Young's modulus (Eb) is within the range of 1.5 to 2.0. When the ratio (Ea/Eb) is less than 1.5 or more than 2.0, the rigidity and curl of the recording material tend to deteriorate, and may interfere with paper when transported.

It has been found that, in general, the "tone" of the paper differs based on differences in the way the paper is beaten, and the elasticity (modulus) of paper from paper-making after beating can be used as an important indication of the "tone" of the paper. The elastic modulus of the paper can be calculated from the following equation by using the relation of the density and the dynamic modulus which shows the physical properties of a viscoelastic object, and by measuring the velocity of sound propagation in the paper using an ultrasonic oscillator.

$$E = \rho c^2 (1 - n^2)$$

where "E" denotes a dynamic modulus, "$\rho$" denotes density, "c" denotes the velocity of sound in paper; and "n" denotes Poisson's ratio.

Since "n" is about 0.2 in a case of an ordinary paper, there is not much difference in the calculation, even if the calculation is performed by the following equation:

$$E = \rho c^2$$

Accordingly, if the density of the paper and acoustic velocity can be measured, the elastic modulus can easily be calculated. In the above equation, when measuring acoustic velocity, various instruments known in the art may be used, such as a Sonic Tester SST-110 (manufactured by Nomura Shoji Co., Ltd.)

The thickness of the raw paper may be appropriately selected according to the purpose, and it is preferably 30 μm to 500 μm, more preferably 50 μm to 300 μm, and still more preferably 100 μm to 250 μm. The basis weight of the raw paper may be appropriately selected according to the purposes and, for example, it is preferably from 50 g/m² to 250 g/m², and more preferably from 100 g/m² to 200 g/m².

The base paper is preferably subjected to a calendering treatment. The calendering treatment is preferably performed so that a metallic roller is brought into contact with the image recording surface side of the base paper.

The surface temperature of the metallic roller is preferably 100° C. or higher, more preferably 150° C. or higher, and still more preferably 200° C. or higher. The upper limit temperature of the surface temperature of the metallic roller may be appropriately selected according to the purposes and is preferably, for example, about 300° C.

The nip pressure in the calendering treatment may be appropriately selected according to the purposes, and is preferably 100 kN/cm² or more, and more preferably from 100 kN/cm² to 600 kN/cm².

The calendar in the calendering treatment may be appropriately selected according to the purposes. This type of calendering may be performed by a soft calender machine having a combination of a metallic roller and a synthetic resin roller or a calender machine having a pair of metallic rollers. Among them, the soft calender machine is preferable in light of a wide nip between the metallic roller and a shoe roller so as to increase a contact area of base paper with the calender rollers.

Polyolefin Resin Layer

The polyolefin resin layer is provided with at least one layer on both surfaces of the base paper and is provided with at least two front surface polyolefin resin at the image recording layer side of the base paper, and comprises an outermost front surface polyolefin resin layer which is located farthest from the base paper, and a front surface polyolefin resin layer other than the outermost polyolefin resin layer.

In this case, when the front surface polyolefin resin layer is a layer in which two layers, that is, a lower polyolefin resin layer and an upper polyolefin resin layer are laminated in this sequence on the base paper, the upper polyolefin resin layer is an outermost front surface polyolefin resin layer and the lower polyolefin resin layer is a front surface polyolefin resin layer other than the outermost front surface polyolefin resin layer.

When the front surface polyolefin resin layer is a layer in which three layers, that is, a lower polyolefin resin layer, an intermediate polyolefin resin layer and an upper polyolefin resin layer are laminated in this order on the base paper, the upper polyolefin resin layer is an outermost front surface polyolefin resin layer, the lower polyolefin resin layer and the intermediate polyolefin resin layer are front surface polyolefin resin layers other than the outermost front surface polyolefin resin layer.

The present invention is characterized in that an average density of the outermost front surface polyolefin resin layer, which is located farthest from the base paper, is smaller than that of at least any front surface polyolefin resin layer other than the outermost front surface polyolefin resin layer. Thus, it is possible to record high quality images without causing blister due to heat upon image recording, development or fixation, and unevenness of recording and unevenness of fixation.

The average density of the outermost front surface polyolefin resin layer is preferably less than 0.930 g/cm³, and more preferably 0.925 g/cm³ or less.

Also, the average density of at least any front surface polyolefin resin layer other than the outermost front surface polyolefin resin layer is preferably 0.930 g/cm³ or more, more preferably 0.950 g/cm³ or more, and the upper limit of the average density is 0.970 g/cm³.

The thickness of at least any front surface polyolefin resin layer other than the outermost front surface polyolefin resin layer is preferably 15 μm or more, more preferably from 15 μm to 20 μm. When the thickness is less than 15 μm, the limit temperature to stand blister decreases and blister occasionally occurs at lower temperature.

Also, the thickness of the outermost front surface polyolefin resin layer is preferably 5 μm or more, and more preferably from 10 to 30 μm. When the thickness of the outermost front surface polyolefin resin layer is less than 5 μm, unevenness of recording or unevenness of fixation caused by poor conformability may occur. When the thickness is more than 30 μm, productivity may decrease because of restriction of the amount of the molten olyolefin resin ejected.

The thickness of the rear surface polyolefin resin layer may be appropriately selected according to the purposes, and is preferably adjusted so that curl in the final formed is flattened in view of curl balance.

The polyolefin resin in the polyolefin resin layer is preferably, for example, a polyethylene resin, a polypropylene resin, a blend of a polypropylene resin and a polyethylene resin, a high density polyethylene resin, or a blend of a high density polyethylene resin and a low density polyethylene resin.

It is preferable that the outermost front surface polyolefin resin layer contains a low density polyethylene resin having a density of 0.930 g/cm³ or less (preferably 0.925 g/cm³ or less), and at least any front surface polyolefin resin layer other than the outermost front surface polyolefin resin layer contains a high density polyethylene resin having a density of 0.945 g/cm³ or more (preferably 0.950 g/cm³ or more).

The content of the high density polyethylene resin having a density 0.945 g/cm³ or more in at least any front surface polyolefin resin layer other than the outermost front surface polyolefin resin layer is preferably 30% by mass or more, and more preferably 50% by mass or more.

At least any polyolefin resin layer (front surface or rear surface) preferably contains an organic pigment or an inorganic pigment.

Examples of the organic pigment include ultramarine blue, cerulean blue, phthalocyanine blue, cobalt violet, fast violet and manganese violet.

Examples of the inorganic pigment include titanium dioxide, calcium carbonate, talc, stearic acid amide and zinc stearate.

Among these inorganic pigments, titanium dioxide is preferable. The titanium dioxide may take an anatase or rutile type. The content of the titanium dioxide in the polyolefin resin layer is preferably from 5 to 30% by mass.

The method of forming the polyolefin resin layer may be appropriately selected according to the purposes, and the polyolefin resin layer is commonly formed by any of a lamination method, a successive lamination method, or a lamination method using a single-layer or multi-layer extrusion die such as feet block type, multi-manifold type or multi-slot type die, or laminator, a co-extrusion coating method of simultaneously extrusion coating of multi-layers. The shape of the die for single-layer or multi-layer extrusion may be appropriately selected according to the purposes and examples of the die include T-die and coat hanger die.

The support for image recording material of the present invention thus obtained can record high quality images without causing blister, unevenness of recording and unevenness of fixation and can be used for various purposes and can be suitably used, for example, for electrophotographic materials, thermosensitive materials, sublimation transfer materials, thermal transfer materials, heat-developable materials, silver salt photographic materials and inkjet recording materials.

Image Recording Material

The image recording material of the present invention comprises the support for image recording material of the present invention, and at least an image recording layer formed on the support, and optionally comprises the other layer.

Herein, the support for image recording material is as described above.

The image recording material is preferably subjected to any one of recording by heating, development by heating and fixation by heating.

Recording by heating is preferably performed by a thermal head and laser.

The development by heating is preferably performed by any one of a heating roller, a heating belt, a plate heater, a thermal head, laser and a combination thereof.

The fixation by heating is preferably performed by any one of a fixing roller, a fixing belt and a combination thereof.

The image recording material varies depending on the purposes and types of the image recording material, and examples thereof include electrophotographic materials, thermosensitive materials, sublimation transfer materials, thermal transfer materials, heat-developable materials, silver salt photographic materials and inkjet recording materials. The electrophotographic material will now be mainly described with respect to the respective image recording materials.

Electrophotographic Material

The electrophotographic material comprises the support for image recording material of the present invention, and a toner receiving layer as the image recording layer formed on at least one surface of the support, and optionally comprises appropriately selected other layers, for example, surface protective layer, backing layer, intermediate layer, undercoat layer, cushion layer, electrification controlling (antistatic) layer, reflection layer, color tone adjusting layer, storage stability improving layer, adhesion preventive layer, anticurling layer, smoothened layer and the like. Each of these layers may have a single-layer structure or a laminated structure.

Toner Receiving Layer

The toner image recording layer receives a color toner image or a black toner image. The toner image is transferred to the toner image recording layer from a developing drum or an intermediate image transfer material with electrostatics or pressure in a transfer step and then fixed by heat or pressure in a fixing step.

The toner image recording layer preferably has a transparency less than 78%, more preferably less than 73%, and most preferably less than 72%, of light transmittance in view of providing a feel of a kind of photograph.

The light transmittance can be obtained from measurements as to a sample toner image recording layer that is the same in structure and thickness as the substantive toner image recording layer but coated on a polyethylene terephthalate film (100 μm) measured by a direct reading Hayes meter (Suga Testing Machine HGM-2DP).

A material for the toner image recording layer contains at least a thermoplastic resin and, may be added with various additives such as releasing agents, plasticizers, coloring agents, fillers, crosslinking agents, electrification controlling agents, emulsifiers, dispersing agents, etc. for the purpose of improving the thermodynamic properties.

Thermoplastic Resin

The thermoplastic resin may be appropriately selected according to the purposes, and examples thereof include (1) polyolefin-based resin, (2) polystyrene-based resin, (3) acrylic resin, (4) polyvinyl acetate or derivative thereof, (5) polyamide-based resin, (6) polyester resin, (7) polycarbonate resin, (8) polyether resin (or acetal resin) and (9) other resins. These thermoplastic resins may be used alone or in combination. Among these thermoplastic resins, styrene-based resin, acrylic resin and polyester-based resin, which have large aggregation energy, are preferably used in view of embedding of the toner.

The polyolefin-based resin (1) includes, for example, a copolymer resin of a polyolefin resin such as polyethylene or polypropylene, and the other vinyl monomer such as ethylene or propylene. The copolymer resin of the olefin and the other vinyl monomer includes, for example, an ethylene-vinyl acetate copolymer, and an ionomer resin as a copolymer of acrylic acid and methacrylic acid. Examples of the derivative of the polyolefin resin include chlorinated polyethylene and chlorosulfonated polyethylene. Examples of the polystyrene-based resin (2) include polystyrene resin, styrene-isobutylene copolymer, acrylonitrile-styrene copolymer (AS resin), acrylonitrile-butadiene-styrene copolymer (ABS resin) and polystyrene-maleic anhydride resin.

The acrylic resin (3) includes, for example, polyacrylic acid or esters thereof, polymethacrylic acid or esters thereof, polyacrylonitrile and polyacrylamide.

The esters of the polyacrylic acid include, for example, a homopolymer or a multi-component copolymer of an ester of acrylic acid. Examples of the ester of the acrylic acid include methyl acrylate, ethyl acrylate, n-butyl acrylate, isobutyl acrylate, dodecyl acrylate, n-octyl acrylate, 2-ethylhexyl acrylate, 2-chloroethyl acrylate, phenyl acrylate and α-chloromethyl acrylate.

The esters of the polymethacrylic acid include, for example, a homopolymer or a multi-component copolymer of an ester of methacrylic acid. The ester of the methacrylic acid includes, for example, methyl methacrylate, ethyl methacrylate and butyl methacrylate.

The polyvinyl acetate (4) or a derivative thereof includes, for example, polyvinyl acetate, polyvinyl alcohol obtained by saponifying polyvinyl acetate, and polyvinylacetal resin obtained by reacting polyvinyl alcohol with aldehyde (for example, formaldehyde, acetaldehyde, butylaldehyde, etc.).

The polyamide-based resin (5) is a polycondensate of diamine and dibasic acid and examples thereof include 6-nylon and 6,6-nylon.

The polyester resin (6) can be prepared by condensation polymerization of an acid component and an alcohol component. The acid component may be appropriately selected according to the purposes, and examples thereof include maleic acid, fumaric acid, citraconic acid, itaconic acid, glutaconic acid, phthalic acid, terephthalic acid, isophthalic acid, succinic acid, adipic acid, sebacic acid, azelaic acid, malonic acid, n-dodecylsuccinic acid, isododecylsuccinic acid, n-dodecylsuccinic acid, isododecylsuccinic acid, n-octenylsuccinic acid, n-octylsuccinic acid, isooctenylsuccinic acid, isooctylsuccinic acid, trimellitic acid, pyromellitic acid, and an acid anhydride thereof, or a lower alkyl ester thereof.

The alcohol component may be appropriately selected according to the purposes and is, for example, preferably a dihydric alcohol. Examples of the aliphatic diol include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol and polytetramethylene glycol. Examples of the alkylene oxide adduct of bisphenol A include polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane and polyoxypropylene(6)-2,2-bis(4-hydroxyphenyl)propane.

The polycarbonate resin (7) is generally a polycarboxylate ester obtained from bisphenol A and phosgene.

The polyether resin (or acetal resin) (8) includes, for example, polyether resin such as polyethylene oxide or polypropylene oxide, and ring-opening polymerization-based acetal resin such as polyoxymethylene.

Examples of the other resin (9) include polyaddition-based polyurethane resin.

The thermoplastic resin preferably satisfies toner image receiving layer properties, which will be described hereinafter, when formed into a toner image receiving layer, and more preferably satisfies the toner image receiving layer properties by itself. It is also preferable to use in combination two or more resins which have different toner image receiving layer properties The thermoplastic resin preferably has a molecular weight which is larger than that of a thermoplastic resin used in the toner. However, according to the relationship of the thermodynamic properties of the thermoplastic resin used in the toner and the properties of the resin used in the toner image receiving layer, the relationship of the molecular weights as described above is not necessarily preferable. For example, when a softening temperature of the resin used in the toner image receiving layer is higher than that of the thermoplastic resin used in the toner, there are cases in which the molecular weight of the resin used in the toner image receiving layer is preferably the same or smaller.

It is also preferable that the thermoplastic resin be a mixture of resins with identical compositions having different average molecular weights. The preferable relationship with molecular weights of thermoplastic resins used in toners is disclosed in JP-A No. 8-334915.

Molecular weight distribution of the thermoplastic resin is preferably wider than that of the thermoplastic resin used in the toner.

It is preferable that the thermoplastic resin constituting the toner receiving image layer satisfies the physical properties disclosed in JP-A Nos. 05-127413, 08-194394, 08-334915, 08-334916, 09-171265 and 10-221877.

It is particularly preferable that the thermoplastic resin for a toner image receiving layer is an aqueous resin such as water soluble polymer, water dispersible polymer or the like for the following reasons (i) and (ii). (i) Since no organic solvent is discharged in coating and drying steps, it is excellent in environmental preservation and workability. (ii) Since many release agents such as wax are difficult to dissolve in a solvent at room temperature, often they are dispersed in a solvent (water or an organic solvent) before use. Further, an aqueous dispersion is more stable and is excellently suitable for a manufacturing process. In addition, with aqueous coating, wax bleeds on the surface more easily during the step of coating and drying, and the effects of a release agent (anti-offset properties, adhesive resistance, etc.) is facilitated more easily.

The aqueous resin may not be specifically limited with regards to its composition, bonding structure, molecular weight, molecular weight distribution and form as long as it is a water dispersible polymer or a water soluble polymer, and can be appropriately selected according to the purposes. Examples of the substituents which render a resin aqueous include sulfonic acid group, hydroxyl group, carboxylic acid group, amino group, amide group and ether group.

The water dispersible resin may be appropriately selected from resins and emulsions in which the thermoplastic resins of (1) to (9) are water-dispersed; and copolymers thereof, mixtures thereof, and those which are cation-modified. Two or more of these may be used in combination.

As for the water dispersible polymers, appropriately synthesized polymers or commercially available products may be used. Examples of the commercial available products of the water dispersible polymers include, for polyester-based water dispersible polymers, Vylonal series manufactured by Toyobo Co., Ltd., Pesresin A series manufactured by Takamatsu Oil & Fat Co., Ltd., Tuftone UE series manufactured by Kao Corp., Polyester WR series manufactured by Nippon Synthetic Chemical Industry Co., Ltd., Elitel series manufactured by Unitika Ltd., and the like; and for acrylic water dispersible polymers, Hiros XE, KE, and PE series manufactured by Seiko Chemical Industries Co., Ltd., Jurymer ET series manufactured by Nihon Junyaku Co., Ltd., and the like.

The water dispersible emulsion may be appropriately selected according to the purposes; examples thereof include water dispersible polyurethane emulsion, water dispersible polyester emulsion, chloroprene-based emulsion, styrene-butadiene-based emulsion, nitrile-butadiene-based emulsion, butadiene-based emulsion, vinyl chloride-based emulsion, vinylpyridine-styrene-butadiene-based emulsion, polybutene-based emulsion, polyethylene-based emulsion, vinyl acetate-based emulsion, ethylene-vinyl acetate-based emulsion, vinylidene chloride-based emulsion and methyl methacrylate-butadiene-based emulsion. Among these emulsions, a water dispersible polyester emulsion is particularly preferable.

The water dispersible polyester emulsion is preferably a self-dispersing type aqueous polyester emulsion, and particularly preferably a carboxyl group-containing self-dispersing type aqueous polyester resin emulsion. As used herein, the self-dispersing type aqueous polyester emulsion means an aqueous emulsion containing a polyester resin which can be self-dispersed in an aqueous solvent without using an emulsifier. The carboxyl group-containing self-dispersing type aqueous polyester resin emulsion means an aqueous emulsion containing a polyester resin having a carboxyl group as a hydrophilic group, which can be self-dispersed in an aqueous solvent.

It is desirable to use a self-dispersing water dispersible polyester resin emulsion satisfying the following properties (1) to (4) as the above-mentioned thermoplastic resin in the present invention. As this is a self-dispersing type which does not use a surfactant, its hygroscopicity is low even in a high humidity environment, its softening point is not much reduced by moisture, and offset produced during fixing, or sticking of sheets in storage, can be suppressed. Moreover, since it is aqueous, it is very environmentally friendly and has excellent workability. As it uses a polyester resin which easily assumes a molecular structure with high cohesion energy, it has sufficient hardness in a storage environment, assumes a melting state of low elasticity (low viscosity) in the fixing step for electrophotography, and toner is embedded in the toner image receiving layer so that a sufficiently high image quality is attained.

(1) The number average molecular weight (Mn) is preferably 5,000 to 10,000, and more preferably 5,000 to 7,000.
(2) The molecular weight distribution (Mw/Mn) (weight average molecular weight/number average molecular weight) is preferably 4 or less, and more preferably 3 or less.
(3) The glass transition temperature (Tg) is preferably 40° C. to 100° C., and more preferably 50° C. to 80° C.
(4) The volume average particle diameter is preferably 20 nm to 200 nm, and more preferably 40 nm to 150 nm.

The content of the water dispersible toner emulsion in the toner image receiving layer is preferably from 10% by mass to 90% by mass, and more preferably from 10% by mass to 70% by mass.

The water soluble polymer may be appropriately selected according to the purposes as long as it has a weight average molecular weight (Mw) of 400,000 or less, and appropriately synthesized polymers or commercially available products may be used. Examples thereof include polyvinyl alcohol, carboxy-modified polyvinyl alcohol, carboxymethyl cellulose, hydroxyethyl cellulose, cellulose sulfate, polyethylene oxide, gelatin, cationized starch, casein, sodium polyacrylate, styrene-maleic anhydride copolymer sodium salt and sodium polystyrene sulfonate. Among these, polyethylene oxide is preferable.

Examples of the commercially available water soluble polymers include, for water soluble polyesters, various types of Pluscoat (manufactured by Gao Chemical Industry Co., Ltd.), various types of Fintex ES series (manufactured by Dainippon Ink and Chemicals, Incorporated); and for water soluble acryls, various types of Jurimar AT series (manufactured by Nippon Fine Chemical Co., Ltd.), Fintex 6161 and Fintex K-96 (manufactured by Dainippon Ink and Chemicals, Incorporated), and Hyros NL-1189 and Hyros BH-997L (manufactured by Seiko Chemical Industry Co., Ltd.).

Examples of the water soluble polymers are described in page 26 of Research Disclosure No. 17,643, page 651 of Research Disclosure No. 18,716, pages 873-874 of Research Disclosure No. 307,105, and JP-A No. 64-13546.

The content of the water soluble polymer in the toner receiving layer may be appropriately selected according to the purposes, and is preferably from 0.5 g/m² to 2 g/m².

The thermoplastic resin can be used in combination with the other polymer material. In that case, the content of the thermoplastic resin is generally more than that of the other polymer material.

The content of a thermoplastic resin for a toner receiving layer in the toner receiving layer is preferably 10% by mass or more, more preferably 30% by mass or more, still more preferably 50% by mass or more, and particularly preferably from 50 to 90% by mass.

Releasing Agent

The releasing agent is blended in the toner image recording layer so as to prevent the toner image recording layer from offsetting. The releasing agent may be appropriately selected as long as it melts at a fixing temperature sufficiently enough to separate out onto the surface of the toner image recording layer in a mal-distribution state and further forms a layer of releasing material on the toner image recording layer resulting from being cooled and solidified.

Examples of the releasing agent include at least one selected from silicone compounds, fluorine compounds, waxes and matting agents.

The releasing agent may, for example, be a compound described in "Properties and Applications of Wax (Revised)" by Saiwai Publishing, or in the Silicone Handbook published by THE NIKKAN KOGYO SHIMBUN. Also, it is possible to use the silicone-based compounds, fluorine compounds and wax in the toners described in Japanese Patent Application Publication (JP-B) Nos. 59-38581 and 04-32380, Japanese Patent Nos. 2,838,498 and 2,949,558, Japanese Patent Application Laid-Open JP-A) Nos. 50-117433, 52-52640, 57-148755, 61-62056, 61-62057, 61-118760, 02-42451, 03-41465, 04-212175, 04-214570, 04-263267, 05-34966, 05-119514, 06-59502, 06-161150, 06-175396, 06-219040, 06-230600, 06-295093, 07-36210, 0743940, 07-56387, 07-56390, 07-64335, 07-199681, 07-223362, 07-287413, 08-184992, 08-227180, 08-248671, 08-248799, 08-248801, 08-278663, 09-152739, 09-160278, 09-185181, 09-319139, 09-319143, 10-20549, 10-48889, 10-198069, 10-207116, 11-2917, 11-44969, 11-65156, 11-73049, and 11-194542. These compounds can also be used in combination.

Examples of the silicone-based compound include silicone oil, silicone rubber, silicone fine particles, silicone-modified resin and reactive silicone compound.

Examples of the silicone oil include unmodified silicone oil, amino-modified silicone oil, carboxy-modified silicone oil, carbinol-modified silicone oil, vinyl-modified silicone oil, epoxy-modified silicone oil, polyether-modified silicone oil, silanol-modified silicone oil, methacryl-modified silicone oil, mercapto-modified silicone oil, alcohol-modified silicone oil, alkyl-modified silicone oil and fluorine-modified silicone oil.

Examples of the silicone-modified resin include olefin resin, polyester resin, vinyl resin, polyamide resin, cellulose resin, phenoxy resin, vinyl chloride-vinyl acetate resin, urethane resin, acrylic resin, styrene-acrylic resin, or resins obtained by modifying these copolymer resins with silicone.

The fluorine compound may be appropriately selected according to the purposes, and examples thereof include fluorine oil, fluororubber, fluorine-modified resin, fluorinesulfonic acid compound, fluorosulfonic acid, fluoric acid compound or a salt thereof, and inorganic fluoride.

The wax can be roughly classified into a natural wax and a synthetic wax.

The natural wax is preferably any wax selected from vegetable wax, animal wax, mineral wax and petroleum wax, among which vegetable wax is particularly preferable. The natural wax is also preferably a water dispersible wax, in view of compatibility when a water dispersible thermoplastic resin is used as the thermoplastic resin in the toner image receiving layer.

The vegetable wax may be appropriately selected from known ones and commercially available products and appropriately synthesized waxes may be used. Examples of the vegetable wax include carnauba wax, castor oil, rape seed oil, soybean oil, Japan tallow, cotton wax, rice wax, sugar cane wax, candellila wax, Japan wax and jojoba oil.

Examples of the commercially available carnauba wax include EMUSTAR-0413 manufactured by NIPPON SEIRO CO., LTD. and Cellozol 524 manufactured by CHUKYO YUSHI CO., LTD. Examples of the commercially available castor oil include purified castor oil manufactured by Itoh Oil Chemicals Co., Ltd.

Among these, carnauba wax having a melting point of 70° C. to 95° C. is particularly preferable in view of providing an electrophotographic material which is excellent in antioffset properties, adhesive resistance, paper transporting properties and gloss, and is less likely to cause cracking, and is also capable of forming high quality images.

The animal wax may be appropriately selected from known ones, and examples thereof include beeswax, lanolin, whale wax, spermaceti wax (whale oil) and wool wax.

The animal wax may be appropriately selected from known ones, and commercially available products and appropriately synthesized waxes may be used. Examples thereof include Montan wax, Montan-based ester wax, ozocerite and ceresin.

Among these, carnauba wax having a melting point of 70° C. to 95° C. is particularly preferable in view of providing an electrophotographic material which is excellent in antioffset properties, adhesive resistance, paper transporting properties and gloss, and is less likely to cause cracking, and is also capable of forming high quality images.

The petroleum wax may be appropriately selected from known ones, and commercially available products and appropriately synthesized waxes may be used. Examples thereof include paraffin wax, microcrystalline wax and petrolatum.

The content of the natural wax in the toner receiving layer is preferably from 0.1 to 4 g/m$^2$, and more preferably from 0.2 to 2 g/m$^2$.

When the content is less than 0.1 g/m$^2$, antioffset properties and adhesive resistance may become particularly insufficient. On the other hand, when the content is more than 4 g/m$^2$, the amount of the wax is too large and images thus formed may be inferior in image quality.

The melting point of the natural wax is preferably from 70° C. to 95° C., and more preferably from 75° C. to 90° C., in view of antioffset properties and paper transporting properties.

The synthetic waxes are classified into synthetic hydrocarbon, modified wax, hydrogenated wax, and other fat and oil-based synthetic wax. Among these waxes, water dispersible wax is preferable in view of compatibility when an aqueous thermoplastic resin is used as a thermoplastic resin of the toner receiving layer.

Examples of the synthetic hydrocarbon include fisher-tropush wax and polyethylene wax.

Examples of the fat and oil-based synthetic wax include an acid amide compound (for example, stearic acid amide, etc.) and an acid imide compound (for example, phthalic anhydride imide, etc.).

The modified wax may be appropriately selected according to the purposes, and examples thereof include amine-modified wax, acrylic acid-modified wax, fluorine-modified wax, olefin-modified wax, urethane type wax and alcohol type wax.

The hydrogenated wax may be appropriately selected according to the purposes, and examples thereof include hardened castor oil, castor oil derivative, stearic acid, lauric acid, myristic acid, palmitic acid, behenic acid, sebacic acid, undecylenic acid, heptynoic acid, maleic acid and highly maleinized oil.

The melting point of the releasing agent is preferably from 70° C. to 95° C., and more preferably from 75° C. to 90° C., in view of antioffset properties and paper transporting properties.

As the releasing agent to be added in the toner receiving layer, for example, derivatives, oxides, purified products, and mixtures thereof can also be used. Also, these releasing agents may have a reactive substituent.

The content of the releasing agent is preferably from 0.1 to 10% by mass, more preferably from 0.3 to 8.0% by mass, and still more preferably from 0.5 to 5.0% by mass, based on the mass of the toner receiving layer. When the content is less than 0.1% by mass, antioffset properties and adhesive resistance may become insufficient. On the other hand, when the content is more than 10% by mass, the amount of the releasing agent is too large and image quality of the images thus formed may deteriorate.

Plasticizer

The plasticizer is not specifically limited and known plasticizers for resin can be appropriately selected according to the purposes. The plasticizer has the effect of adjusting the fluidity or softening of the toner image receiving layer due to heat and pressure.

The plasticizer can be selected by referring to "Chemical Handbook" (Chemical Institute of Japan, Maruzen), "Plasticizers—their Theory and Application" (ed. Koichi Murai, Saiwai Shobo), "The Study of Plasticizers, Part 1" and "The Study of Plasticizers, Part 2" (Polymer Chemistry Association), or "Handbook of Rubber and Plastics Blending Agents" (ed. Rubber Digest Co.).

Although the plasticizers are described as a high boiling point organic solvent, a hot solvent or the like, examples thereof include compounds, for example, esters (for example, phthalate esters, phosphate esters, fatty acid esters, abietate esters, adipate esters, sebacate esters, azelate esters, benzoate esters, butyrate esters, epoxydated fatty acid esters, glycolate esters, propionate esters, trimellitate esters, citrate esters, sulfonate esters, carboxylates esters, succinate esters, maleate esters, fumarate esters, phthalate esters, stearate esters, etc.), amides (for example, fatty acid amides, sulfoamides, etc.), ethers, alcohols, lactones and polyethyleneoxys, which are disclosed in, for example, JP-A Nos. 59-83154, 59-178451, 59-178453, 59-178454, 59-178455, 5-178457, 62-174754, 62-245253, 61-209444, 61-200538, 66-8145, 62-9348, 62-30247, 62-136646 and 02-235694. These plasticizers can be mixed with the resin when used.

The plasticizers may be polymers having relatively low molecular weight. In this case, it is preferred that the molecular weight of the plasticizer is lower than the molecular weight of the binder resin to be plasticized. Preferably, plasticizers have a molecular weight of 15,000 or less, and more preferably 5,000 or less. When a polymer plasticizer is used as the plasticizer, the polymer of the polymer plasticizer is the same as that of the binder resin to be plasticized. For example, when the polyester resin is plasticized, polyester having low molecular weight is preferable. Further, oligomers may also be used as plasticizers.

In addition to the compounds described above, there are commercially products such as, for example, Adecasizer PN-170 and PN-1430 (manufactured by Asahi Denka Co., Ltd.); PARAPLEX-G-25, G-30 and G-40 (manufactured by C. P. Hall); and Ester Gum 8L-JA, Ester R-95, Pentalin 4851, FK 115, 4820, 830, Ruizol 28-JA, Picolastic A75, Picotex LC and Cristalex 3085 (manufactured by Rika Hercules, Inc.).

The plasticizer can be used as desired to relax stress and distortion (physical distortions of elasticity and viscosity, and distortions of mass balance in molecules, binder main chains or pendant portions) which are produced when toners are embedded in the toner image receiving layer.

The plasticizer may be dispersed in micro in the toner image receiving layer. The plasticizer may also be dispersed in micro in a state of sea-island, in the toner image receiving layer. The plasticizer may present in the toner image receiving layer in a state of sufficiently mixed with other components such as binder.

The content of the plasticizer in the toner image receiving layer is preferably from 0.001% by mass to 90% by mass, more preferably from 0.1% by mass to 60% by mass, and still more preferably from 1% by mass to 40% by mass.

The plasticizer may be used for the purpose of adjusting slidability (improvement of transportability by reducing friction), improving fixing part offset (release of toner or layer to the fixing part) and adjusting electrification (formation of a toner electrostatic image).

Colorant

The colorant may be appropriately selected according to the purposes, and examples thereof include fluorescent whitening agents, white pigments, colored pigments and dyes.

The fluorescent whitening agent may be appropriately selected from known ones as long as it is a compound which has absorption in the near-ultraviolet region and emits fluorescence at 400 nm to 500 nm. Examples of the fluorescent whitening agent include the compounds described in "The Chemistry of Synthetic Dyes" Volume V, Chapter 8 edited by K. VeenRataraman. Specific examples of the fluorescent whitening agent include stilbene-based compounds, coumarin-based compounds, biphenyl-based compounds, benzo-oxazoline-based compounds, naphthalimide-based compounds, pyrazoline-based compounds and carbostyryl-based compounds. Examples of the commercial fluorescent whitening agents include WHITEX PSN, PHR, HCS, PCS and B (manufactured by Sumitomo Chemicals) and UVI-TEX-OB (manufactured by Ciba-Geigy, Co., Ltd).

The white pigment may be appropriately selected from known ones and, for example, inorganic pigments such as titanium oxide and calcium carbonate can be used.

The colored pigment may be appropriately selected from known ones, and examples thereof include various pigments, azo pigments, polycyclic pigments, condensed polycyclic pigments, lake pigments and carbon black described in JP-A No. 63-44653.

Examples of the azo pigment include azolakes (for example, Carmin 6B, Red 2B, etc.), insoluble azo pigments (for example, monoazo yellow, disazo yellow, pyrazolo orange, Balkan orange, etc.) and condensed azo-based pigments (for example, chromophthal yellow and chromophthal red).

Examples of the polycyclic pigment include phthalocyanine-based pigments such as copper phthalocyanine blue and copper phthalocyanine green.

Examples of the condensed polycyclic pigment include dioxazine-based pigments (for example, dioxadine violet, etc.), isoindolinone-based pigments (for example, isoindolinone yellow, etc.), threne-based pigments, perylene-based pigments, perynone-based pigments and thioindigo-based pigments.

Examples of the lake pigment include malachite green, rhodamine B, rhodamine G and victoria blue B.

Examples of the inorganic pigment include oxides (for example, titanium dioxide, blood red, etc.), sulfates (for example, precipitated barium sulfate, etc.), carbonate (for example, precipitated calcium carbonate, etc.), silicates (for example, hydrous silicate, anhydrous silicate, etc.) and metal powders (for example, aluminum powder, bronze powder, zinc powder, chrome yellow and Prussian blue).

These pigments may be used alone or in combination.

The dye is may be appropriately selected from known ones, and examples thereof include anthraquinone-based compounds and azo-based compound. These dyes may be used alone or in combination.

Examples of the water insoluble dye include vat dyes, disperse dyes and oil soluble dyes. Examples of the vat dyes include C.I.vat violet 1, C.I.vat violet 2, C.I.vat violet 9, C.I.vat violet 13, C.I.vat violet 21, C.I.vat blue 1, C.I.vat blue 3, C.I.vat blue 4, C.I.vat blue 6, C.I.vat blue 14, C.I.vat blue 20 and C.I.vat blue 35. Examples of the disperse dyes include C.I.disperse violet 1, C.I.disperse violet 4, C.I.disperse violet 10, C.I.Disperse blue 3, C.I.Disperse blue 7 and C.I.Disperse blue 58. Examples of the oil-soluble dyes include C.I.solvent violet 13, C.I.solvent violet 14, C.I.solvent violet 21, C.I.solvent violet 27, C.I.solvent blue 11, C.I.solvent blue 12, C.I.solvent blue 25 and C.I.solvent blue 55.

Colored couplers used in silver halide photography may also be preferably used.

The content of the colorant in the toner image receiving layer is preferably from 0.1 $g/m^2$ to 8 $g/m^2$, and more preferably from 0.5 $g/m^2$ to 5 $g/m^2$.

When the content of colorant is less than 0.1 $g/m^2$, the light transmittance in the toner image receiving layer becomes high. When it is more than 8 $g/m^2$, handling becomes more difficult, due to cracking and adhesive resistance.

In the colorant, the amount of the pigment to be added is, based on the mass of the thermoplastic resin constituting the toner image receiving layer, preferably 40% by mass or less, more preferably 30% by mass or less, and still more preferably 20% by mass or less.

The filler may be an organic or inorganic filler. Reinforcers for binder resins, bulking agents and reinforcements known in the art may be used. The filler may be one of those described in "Handbook of Rubber and Plastics Additives" (ed. Rubber Digest Co.), "Plastics Blending Agents-Basics and Applications" (New Edition) (Taihei Co.) and "Filler Handbook" (Taihei Co.).

As the filler, various inorganic fillers or pigments can be used. Examples of inorganic pigments include silica, alumina, titanium dioxide, zinc oxide, zirconium oxide, micaceous iron oxide, white lead, lead oxide, cobalt oxide, strontium chromate, molybdenum pigments, smectite, magnesium oxide, calcium oxide, calcium carbonate and mullite. Silica and alumina are particularly preferred. These fillers may be used either alone or in combination of two or more. It is preferred that the filler has a small particle diameter. If the particle diameter is large, the surface of the toner image receiving layer may tend to become rough.

Examples of the silica include spherical silica and amorphous silica. The silica may be synthesized by the dry method, wet method or aerogel method. The surface of the hydrophobic silica particles may also be treated by trimethylsilyl groups or silicone. Colloidal silica is preferred. The silica is preferably porous.

The alumina includes anhydrous alumina and hydrated alumina. Examples of crystallized anhydrous aluminates which may be used, are α, β, γ, δ, ζ, η, θ, κ, ρ or χ. Hydrated alumina is preferred to anhydrous alumina. The hydrated alumina may be a monohydrate or trihydrate. Monohydrates include pseudo-boehmite, boehmite and diaspore. Trihydrates include gibbsite and bayerite. The alumina is preferably porous.

The alumina hydrate can be synthesized by the sol-gel method, in which ammonia is added to an aluminum salt solution to precipitate alumina, or by hydrolysis of an alkali aluminate. Anhydrous alumina can be obtained by dehydrating alumina hydrate by the action of heat.

The filler is preferably from 5 parts by mass to 2,000 parts by mass relative to 100 parts of the dry mass of the binder of the toner receiving layer to which it is added.

A crosslinking agent can be added in order to adjust the storage stability or thermoplastic properties of the toner image receiving layer. Examples of the crosslinking agent include compounds having two or more reactive groups in the molecule, such as an epoxy group, an isocyanate group, an aldehyde group, an active halogen group, an active methylene group, an acetylene group and other reactive groups known in the art.

The crosslinking agent may also be a compound having two or more groups capable of forming bonds such as hydrogen bonds, ionic bonds, coordinate bonds.

The crosslinking agent may be a compound known in the art such as a coupling agent for resin, curing agent, polymerizing agent, polymerization promoter, coagulant, film-forming agent and film-forming assistant. Examples of the coupling agents include chlorosilanes, vinylsilanes, epoxysilanes, aminosilanes, alkoxyaluminum chelates, titanate coupling agents, and the like. The examples further include other agents known in the art such as those mentioned in Handbook of Rubber and Plastics Additives (ed. Rubber Digest Co.).

The charge control agent preferably adjusts transfer and adhesion of toner, and prevents charge adhesion of a toner image receiving layer.

The charge control agent may be those conventionally known in the art and may be appropriately used according to the purposes. Examples of the charge control agents include surfactants such as cationic surfactants, anionic surfactants, amphoteric surfactants and nonionic surfactants; polymer electrolytes, and electroconductive metal oxides. Specific examples of the surfactants include cationic charge inhibitors such as quaternary ammonium salts, polyamine derivatives, cation-modified polymethylmethacrylate and cation-modified polystyrene; anionic charge inhibitors such as alkyl phosphates and anionic polymers; and nonionic charge inhibitors such as aliphatic ester and polyethylene oxide. When the toner has a negative charge, cationic charge control agent and nonionic charge control agent, for example, are preferable.

Examples of the electroconductive metal oxides include $ZnO$, $TiO_2$, $SnO_2$, $Al_2O_3$, $In_2O_3$, $SiO_2$, $MgO$, $BaO$ and $MoO_3$. These metal oxides may be used alone or in combination. Moreover, the metal oxide may contain other elements. For example, $ZnO$ may contain Al, In or the like, $TiO_2$ may contain Nb, Ta or the like, and $SnO_2$ may contain (or, dope) Sb, Nb, halogen elements or the like.

Other Additives

The materials used to obtain the toner image receiving layer may also contain various additives to improve image stability when output, or to improve stability of the toner image receiving layer itself. Examples of the additives include antioxidants, age resistors, degradation inhibitors, anti-ozone degradation inhibitors, ultraviolet absorbers, metal complexes, light stabilizers, preservatives and fungicide.

Examples of the antioxidants include chroman compounds, coumarane compounds, phenol compounds (for example, hindered phenols), hydroquinone derivatives, hindered amine derivatives and spiroindan compounds. The antioxidants can be described, for example, in JP-A No. 61-159644.

The age resistors are may be appropriately adjusted according to the purposes, and examples thereof include those described in "Handbook of Rubber and Plastics Additives, Second Edition" (1993, Rubber Digest Co.), pp. 76-121.

Examples of the ultraviolet absorbers include benzotriazo compounds (see U.S. Pat. No. 3,533,794), 4-thiazolidone compounds (see U.S. Pat. No. 3,352,681), benzophenone compounds (see JP-A No. 46-2784), ultraviolet ray absorbing polymers (see JP-A No. 62-260152).

The metal complex may be appropriately selected according to the purposes and preferable metal complexes are those described in U.S. Pat. Nos. 4,241,155, 4,245,018 and 4,254,195, JP-A Nos. 61-88256, 62-174741, 63-199248, 01-75568 and 01-74272.

It is also preferably used ultraviolet absorbers and photostabilizers described in "Handbook of Rubber and Plastics Additives, Second Edition" (1993, Rubber Digest Co.), pp. 122-137.

Additives for photography known in the art may also be added to the material used to obtain the toner image receiving layer as described above. Examples of the photographic additives can be described in the Journal of Research Disclosure (hereinafter abbreviated RD) No. 17643 (December 1978), RD No. 18716 (November 1979) and RD No. 307105 (November 1989). The relevant sections are shown in the following table.

TABLE 1

| Kind of additives | RD17643 | RD18716 | RD307105 |
|---|---|---|---|
| Whitening agent | Page 24 | Page 648, right column | Page 868 |
| Stabilizer | Pages 24-25 | Page 649, right column | Pages 868-870 |
| Photoabsorber Ultraviolet | Pages 25-26 | Page 649, right column | Page 873 |
| Pigment image stabilizer | Page 25 | Page 650, right column | Page 872 |
| Hardener | Page 26 | Page 651, right column | Pages 874-875 |
| Binder | Page 26 | Page 651, right column | Pages 873-874 |
| Plasticizer, Lubricant | Page 27 | Page 650, right column | Page 876 |
| Auxiliary application | Pages 26-27 | Page 650, right column | Pages 875-876 |
| Antistatic agent | Page 27 | Page 650, right column | Pages 876-877 |
| Matting agent | — | — | Pages 878-879 |

The toner image receiving layer of the present invention is formed by applying a coating solution containing a thermoplastic resin for the toner image receiving layer using a wire coater on the support, and drying the coating solution. The minimum film-forming temperature (MFT) of the thermoplastic resin is preferably room temperature or higher in view of pre-print storage, and is preferably 100° C. or lower in view of fixing toner particles.

The coating mass of after drying of the toner receiving layer is preferably, for example, from 1 to 20 g/m$^2$, and more preferably from 4 to 15 g/m$^2$.

The thickness of the toner image receiving layer may be appropriately selected according to the purposes and is preferably more than ½ of the particle size of a toner used therein, and more preferably a thickness one to three times as thick as the particle size of a toner used therein. Specifically, the thickness of the toner image receiving layer is preferably from 1 μm to 50 μm, more preferably from 1 μm to 30 μm, still more preferably from 1 μm to 20 μm, and particularly preferably from 5 μm to 15 μm.

Various Physical Properties of Toner Receiving Layer

The 180 degree separation strength of the toner image receiving layer at the fixing temperature by the fixing member is preferably 0.1 N/25 mm or less, and more preferably 0.041 N/25 mm or less. The 180 degree separation strength can be measured based on the method described in JIS K6887 using the surface material of the fixing member.

It is preferred that the toner image receiving layer has a high degree of whiteness. This whiteness is measured by the method specified in JIS P 8123, and is preferably 85% or more. It is preferred that the spectral reflectance is 85% or more in the wavelength of 440 nm to 640 nm, and that the difference between the maximum spectral reflectance and minimum spectral reflectance in this wavelength is within 5%. Further, it is preferred that the spectral reflectance is 85% or more in the wavelength of 400 nm to 700 nm, and that the difference between the maximum spectral reflectance and the minimum spectral reflectance in the wavelength is within 5%.

Specifically, for the whiteness, the value of L* is preferably 80 or higher, more preferably 85 or higher, and still more preferably 90 or higher in a CIE 1976 (L*a*b*) color space. The color tint of the white color is preferably as neutral as possible. Regarding the color tint of the whiteness, the value of $(a^*)^2+(b^*)^2$ is preferably 50 or less, more preferably 18 or less, and still more preferably 5 or less in a (L*a*b*) space.

It is preferred that the toner image receiving layer has a high surface gloss. The 45 degree gloss luster is preferably 60 or higher, more preferably 75 or higher, and still more preferably 90 or higher, over the whole range from white where there is no toner, to black where toner is dense at maximum.

However, the gloss luster is preferably 110 or less. When it is more than 110, the image has a metallic appearance which is undesirable. Gloss luster may be measured by JIS Z 8741.

It is preferred that the toner image receiving layer has a high smoothness. The arithmetic average roughness (Ra) is preferably 3 μm or less, more preferably 1 μm or less, and still more preferably 0.5 μm or less, over the whole range from white where there is no toner, to black where toner is dense at maximum. Arithmetic average roughness may be measured by JIS B 0601, B 0651, and B 0652.

It is preferred that the toner image receiving layer has one of the following physical properties, more preferred that it has several of the following physical properties, and most preferred that it has all of the following physical properties.

(1) Tm (Melting temperature) of the toner image receiving layer is 30° C. or higher, and equal to or lower than Tm+20° C. of the toner.
(2) The temperature at which the viscosity of the toner image receiving layer is $1\times10^5$ cp is 40° C. or higher, lower than the corresponding temperature for the toner.
(3) At a fixing temperature of the toner image receiving layer, the storage elasticity modulus (G') is from $1\times10^2$ Pa to $1\times10^5$ Pa, and the loss elasticity modulus (G") is from $1\times10^2$ Pa to $1\times10^5$ Pa.
(4) The loss tangent (G"/G'), which is the ratio of the loss elasticity modulus (G") and the storage elasticity modulus (G') at a fixing temperature of the toner image receiving layer, is from 0.01 to 10.
(5) The storage modulus (G') at a fixing temperature of the toner image receiving layer is from −50 to +2500, relative to the storage elasticity modulus (G") at a fixing temperature of the toner.
(6) The inclination angle on the toner image receiving layer of the molten toner is 50 degrees or less, and particularly preferably 40 degrees or less.

The toner receiving layer preferably satisfies the physical properties described in JP-B No. 2,788,358, and JP-A Nos. 07-248637, 08-305067 and 10-239889.

It is preferred for the toner image recording layer to have a surface electrical resistivity in a range of from $1\times10^6$ to $1\times10^{15}$ Ω/cm² under conditions of a temperature of 25° C. and a relative humidity of 65%.

When the surface electrical resistivity is less than $1\times10^6$ Ω/cm², the amount of toner transferred to the toner image recording layer is insufficient and the resulting toner image is apt to diminish in density. On the other hand, when the surface electrical resistivity is more than $1\times10^{15}$ Ω/cm², electrostatic charges are generated too much to transfer a sufficient amount of toner to the toner image recording layer. This excessive electrostatic charge generation results in a low density of toner image, adhesion of dust due to electrostatic charges built up during handling the electrophotographic material, miss-feed of the electrophotographic material, double feed of two or more electrophotographic material, generation of charge prints and an occurrence of fractional absence of toner transfer.

The surface electrical resistivity can be estimated by the method meeting JIS K 6911 using a measuring device such as R8340 manufactured by Advantest Co., Ltd. Specifically, the electrical resistivity is measured under conditions of a temperature of 20° C. and humidity of 65% after a lapse of one minute from impression of a voltage of 100 V on a sample after moisturizing the sample for more than 8 hours under the same conditions.

Other Layers

Layers other than the toner image receiving layer of the electrophotographic image receiving sheet include, for example, a surface protective layer, intermediate layer, backing layer, contact improving layer, undercoat, cushion layer, charge control (inhibiting) layer, reflecting layer, tint adjusting layer, storage ability improving layer, anti-adhering layer, anti-curl layer, smoothing layer, and the like. These layers may have a single-layer structure or may be formed of two or more layer.

Surface Protective Layer

A surface protective layer may be disposed on the surface of the toner image receiving layer to protect the surface of the electrophotographic image receiving sheet, to improve storage properties, to improve ease of handling, to facilitate writing, to improve paper transporting properties within an equipment, to confer antioffset properties, or the like. The surface protective layer may comprise one layer, or two or more layers. In the surface protective layer, various thermoplastic resins or thermosetting resins may be used as binders, and are preferably the same types of resins as those of the toner image receiving layer. However, the thermodynamic properties and electrostatic properties are not necessarily identical to those of the toner image receiving layer, and may be individually optimized.

The surface protective layer may comprise the various additives described above which can be used for the toner image receiving layer. In particular, in addition to the releasing agents for the present invention, the surface protective layer may include other additives, for example matting agents or the like. The matting agents may be any of those used in the related art.

In view of fixing properties, it is preferred that the outermost surface layer of the electrophotographic material (for example, surface protective layer, if formed) has good compatibility with the toner. Specifically, it is preferred that the contact angle with molten toner is, for example, from 0 to 40 degrees.

Backing Layer

The backing layer is formed on the back surface of the support opposite to the toner image recording layer for the purpose of providing back surface printing adaptability and improving back surface printing quality, curling balance and pass-though ability to pass though electrophotographic equipments.

Though the backing layer is not always bound by color, it is preferred for the backing layer to be white in the case where the electrophotographic material is of two-sided. The backing layer has a degree of whiteness and a spectral reflecting coefficient both higher than 85% similarly to the toner image recording layer.

In order to improve printing adaptability of both surfaces of the image recording paper, the backing layer may consist of a single layer or multiple layers and may be the same in structure as that at the toner image recording layer.

Further, the backing layer may be blended with additives, in particular, a matting agent and an electrostatic charge adjusting agent, that were previously described.

In the case of using a releasing oil for the fixing rollers, the backing layer may be of an oil absorbing type.

The thickness of the backing layer is preferably from 0.1 µm to 10 µm.

Contact Improving Layer

The electrophotographic material is preferably provided with a contact improving layer for the purpose of improving adhesion between the toner image recording layer and the support paper. The contact improving layer may be blended with various additives including, in particular a crosslinking agent, that were previously described. Further, it is preferred for the electrophotographic material to be provided with a cushioning layer between the contact improving layer and the toner image recording layer for the purpose of improving toner acceptability.

Intermediate Layer

The electrophotographic material may be provided with an intermediate layer between the support and the adhesion improvement layer, between the adhesion improvement layer and the cushioning layer, between the cushioning layer and the toner image recording layer, or between the toner image recording layer and the storage stability improvement layer. In the case where the electrophotographic material consists of the substrate, the toner image recording layer and the intermediate layer, it is of course to put the intermediate layer between the support and the toner image recording layer.

The thickness of the electrophotographic material of the present invention may be appropriately selected according to the purposes and is preferably, for example, from 50 µm to 550 µm, and more preferably from 100 µm to 350 µm.

Toner

In the electrophotographic material, the toner image receiving layer receives toners during printing or copying.

The toner contains at least a binder resin and a colorant, but may contain releasing agents and other components, if necessary.

Binder Resin of Toner

The binder resin may be appropriately selected from those used commonly in the toner according to the purposes and there can be used, for example, vinyl-based homopolymer of styrenes such as styrene and parachorostyrene; vinyl esters such as vinyl naphthalene, vinyl chloride, vinyl bromide, vinyl fluoride, vinyl acetate, vinyl propioniate, vinyl benzoate and vinyl butyrate; methylene aliphatic carboxylates such as methyl acrylate, ethyl acrylate, n-butyl acrylate, isobutyl acrylate, dodecyl acrylate, n-octyl acrylate, 2-cloroethyl acrylate, phenyl acrylate, α-methyl chloroacrylate, methyl methacrylate, ethyl methacrylate and butyl acrylate; vinyl nitriles such as acryloniotrile, methacrylonitrile and acrylamide; vinyl ethers such as vinyl methyl ether, vinyl ethyl ether and vinyl isobutyl ether; N-vinyl compounds such as N-vinyl pyrrole, N-vinylcarbazole, N-vinyl indole and N-vinyl pyrolidone; and vinyl carboxylic acids such as methacrylic acid, acrylic acid and cinnamic acid. These vinyl-based monomers may be used alone, or copolymers thereof may be used. Further, various polyesters may be used, and various waxes may be used in combination.

Among these resins, it is preferable to use a resin of the same type as the resin used for the toner image receiving layer of the present invention.

Colorant of Toner

The colorant may be appropriately selected from those used commonly in the toner, an examples thereof include various pigments such as carbon black, chrome yellow, Hansa yellow, benzidine yellow, threne yellow, quinoline yellow, permanent orange GTR, pyrazolone orange, Balkan orange, watch young red, permanent red, brilliant carmin 3B, brilliant carmin 6B, dippon oil red, pyrazolone red, lithol red, rhodamine B lake, lake red C, rose bengal, aniline blue, ultramarine blue, chalco oil blue, methylene blue chloride, phthalocyanine blue, phthalocyanine green and malachite green oxalate. The colorant also include various dyes such as acridin, xanthene, azo, benzoquinone, azine, anthraquinone, thioindigo, dioxadine, thiadine, azomethine, indigo, thioindigo, phthalocyanine, aniline black, polymethine, triphenylmethane, diphenylmethane, thiazine, thiazole and xanthene dyes. These colorants may be used alone or in combination.

The content of these colorants may be appropriately selected according to the purposes, and is preferably from 2% by mass to 8% by mass. When the content of the colorant is 8% by mass or less, transparency may deteriorate. When the content of colorant is 2% by mass or more, the coloration may become weaker.

Releasing Agent of Toner

The releasing agent may be appropriately selected from those used commonly in the toner and, for example, polar wax containing nitrogen such as highly crystalline polyethylene wax having relatively low molecular weight, Fischer-tropsch wax, amide wax and compound having urethane bonds are particularly effective.

The molecular weight of the polyethylene wax is preferably 1,000 or less, and more preferably from 300 to 1,000.

Compounds having urethane bonds have a solid state due to the strength of the cohesive force of the polar groups even if the molecular weight is low, and as the melting point can be set high in view of the molecular weight, they are suitable. The preferred molecular weight is from 300 to 1,000. The raw materials may be selected from various combinations such as a diisocyane acid compound with a mono-alcohol, a monoisocyanic acid with a mono-alcohol, dialcohol with mono-isocyanic acid, tri-alcohol with a monoisocyanic acid, and a triisocyanic acid compound with mono-alcohol. However, in order to prevent the molecular weight from becoming too large, it is preferable to combine a compound having multiple functional groups with another compound having one functional group, and it is important that the amount of functional groups be equivalent.

Examples of the monoisocyanic acid compounds include dodecyl isocyanate, phenyl isocyanate and derivatives thereof, naphthyl isocyanate, hexyl isocyanate, benzyl isocyanate, butyl isocyanate and allyl isocyanate.

Examples of the diisocyanic acid compounds include tolylene diisocyanate, 4'-diphenylmethane diisocyanate, toluene diisocyanate, 1,3-phenylene diisocyanate, hexamethylene diisocyanate and 4-methyl-m-phenylene diisocyanate, isophorone diisocyanate.

Examples of the mono-alcohol include ordinary alcohols such as methanol, ethanol propanol, butanol, pentanol, hexanol and heptanol.

Examples of the di-alcohols include numerous glycols such as ethylene glycol, diethylene glycol, triethylene glycol, trimethylene glycol, or the like; and examples of the tri-alcohols include trimethylol propane, triethylol propane and trimethanolethane.

These urethane compounds may be mixed with the resin or the colorant during kneading, as an ordinary releasing agent, and used also as a kneaded-crushed toner. Further, in a case of using an emulsion polymerization cohesion toner, the urethane compounds may be dispersed in water together with an ionic surfactant, polymer acid or polymer electrolyte such as a polymer base, heated above the melting point, and converted to fine particles by applying an intense shear in a homogenizer or pressure discharge dispersion machine to manufacture a releasing agent particle dispersion of 1 μm or less, which can be used together with a resin particle dispersion and colorant dispersion.

Other Components of Toner

The toner may also contain other components such as internal additives, charge control agents and inorganic particles. Examples of the internal additives include metals such as ferrite, magnetite, reduced iron, cobalt, nickel and manganese; and alloys or magnets such as compounds containing these metals.

Examples of the charge control agents include dyes such as quaternary ammonium salt, nigrosine compounds, dyes made from complexes of aluminum, iron and chromium, or triphenylmethane pigments. The charge control agent can be selected from the ordinary charge control agent. Materials which are difficult to become solved in water are preferred in view of controlling ionic strength which affects cohesion and stability during melting, and in view of less waste water pollution.

The inorganic fine particles may be any of the external additives for toner surfaces generally used, such as silica, alumina, titania, calcium carbonate, magnesium carbonate and tricalcium phosphate. It is preferred to disperse these with an ionic surfactant, polymer acid or polymer base.

Surfactants can also be used for emulsion polymerization, seed polymerization, pigment dispersion, resin particle dispersion, releasing agent dispersion, cohesion or stabilization thereof. For example, it is effective to use, in combination, anionic surfactants such as sulfate ester salts, sulfonates, phosphate esters and soaps; cationic surfactants such as amine salts and quaternary ammonium salts; or non-ionic surfactants such as polyethylene glycols, alkylphenol ethylene oxide adducts and polybasic alcohols. These may generally be dispersed by a rotary shear homogenizer or a ball mill, sand mill and dyno mill, all of which contain the media.

The toner may also contain an external additive, if necessary. Examples of the external additive include inorganic powders and organic particles. Examples of the inorganic particles include $SiO_2$, $TiO_2$, $Al_2O_3$, $CuO$, $ZnO$, $SnO_2$, $Fe_2O_3$, $MgO$, $BaO$, $CaO$, $K_2O$, $Na_2O$, $ZnO_2$, $CaO.SiO_2$, $K_2O.(TiO_2)_n$, $Al_2O_3.2SiO_2$, $CaCO_3$, $MgCO_3$, $BaSO_4$ and $MgSO_4$. Examples of the organic particles include fatty acids, derivatives thereof, powdered metal salts thereof, and resin powders of fluorine resin, polyethylene resin and acrylic resin.

The average particle diameter of the powder is, for example, preferably from 0.01 μm to 5 μm, and more preferably from 0.1 μm to 2 μm.

The method of producing the toner may be appropriately adjusted according to the purposes, but the toner is preferably produced by a method comprising the steps of (i) forming cohesive particles in a dispersion of resin particles to prepare a cohesive particle dispersion, (ii) adding a fine particle dispersion to the cohesive particle dispersion so that the fine particles adhere to the cohesive particles, thus forming adhesion particles, and (iii) heating the adhesion particles which melt to form toner particles.

Physical Properties of Toner

It is preferred that the volume average particle diameter of the toner is from 0.5 μm or more and 10 μm or less.

If the volume average particle diameter of the toner is too small, it may have an adverse effect on handling of the toner (supplementation, cleaning properties, flowability, etc.), and productivity of the particles may deteriorate. On the other hand, if the volume average particle diameter is too large, it may have an adverse effect on image quality and resolution, both of which lead to granular and transferring properties.

It is preferred that the toner satisfies the above volume average particle diameter range, and that the volume average particle distribution index (GSDv) is 1.3 or less.

It is preferred that the ratio of the volume average polymer distribution index (GSDv) to the number average particle distribution index (GSDn), (GSDv/GSDn), is 0.95 or more.

It is preferred that the toner satisfies the volume average particle diameter range, and that the average value of the shape factor expressed by the following equation is 1.00 to 1.50:

$$\text{Shape factor} = (\pi \times L)^2 / (4 \times S)$$

where "L" denotes the maximum length of the toner particles, and "S" denotes the projection surface area of a toner particle.

If the toner satisfies the above conditions, it has a desirable effect on image quality, and in particular, on granular property and resolution. Also, there is less risk of dropout and blur accompanying with toner transferring, and less risk of adverse effect on handling properties, even if the average particle diameter is not small.

The storage elasticity modulus G' (measured at an angular frequency of 10 rad/sec) of the toner itself at 150° C. is $1 \times 10^2$ Pa to $1 \times 10^5$ Pa which is suitable for improving image quality and preventing offset at a fixing step.

Thermosensitive Material

The thermosensitive material comprises, for example, a support for image recording material of the present invention and at least a thermosensitive recording layer, as the image recording layer, formed on the support, and is used in a thermo-autochrome system (TA system) for forming images by repeated fixing with heat and ultraviolet radiation with a thermal head.

Sublimation Transfer Material

The sublimation transfer material comprises, for example, a support for image recording material of the present invention and at least an ink layer containing a thermal diffusion dye (sublimation dye) formed on the support, and is used in a sublimation transfer system of heating an ink layer with a thermal head to transfer a thermal diffusion dye onto a sublimation transfer sheet.

Thermal Transfer Material

The thermal transfer material comprises, for example, a support for image recording material of the present invention and at least a hot-melt ink layer, as the image forming layer, formed on the support, and is used in a system of heating a hot-melt ink layer with a thermal head to hot-melt transfer the ink onto a thermal transfer sheet.

Heat-developable Material

The heat-developable material comprises, for example, a support for image recording material of the present invention and a heat-developable photosensitive layer as described in JP-A No. 2002-40643, as the image forming layer, and visual images are formed by heating the exposed heat-developable material through a heating system using any one of a heating roller, a heating belt, a plate heater, a thermal head, laser and a combination thereof.

Also, the heat-developable material comprises, for example, a support for image recording material of the present invention and a heat-developable photosensitive layer as described in JP-A No. 2004-246026, as the image forming layer, and visual images are formed by heating the exposed heat-developable material through a heating system using any one of a heating roller, a heating belt, a plate heater, a thermal head, laser and a combination thereof.

Silver Salt Photographic Material

The silver salt photographic paper comprises, for example, a support for image recording material of the present invention and at least yellow (Y), magenta (M) and cyan (C) image forming layers formed on the support, and printing of the silver salt photographic paper is achieved using a silver halide photographic system of passing an exposed silver halide photographic paper through plural processing baths for color development, bleaching and fixing, washing and drying.

Inkjet Recording Material

The ink jet printing paper comprises, for example, a support for image recording material of the present invention and a color material receiving layer formed on the support so as to receive an liquid ink such as an aqueous ink (comprising dye or pigment as a color material) and an oil-based ink or a solid ink that is solid at normal temperature and is liquefied upon printing.

Printing Paper

The support for image recording material is preferably used as a printing paper. In this case, the image recording material preferably has a high mechanical strength in light of applying ink using a printing machine.

The printing paper is particularly suited for use as a paper for offset printing and also can be used as a letterpress printing paper, a gravure printing paper and an electrophotographic paper.

The image recording material of the present invention comprises a support for image recording material which does not cause blister, unevenness of recording and unevenness of fixation, and the image recording layer formed on the support, and is therefore capable of recording high quality images, and is suited for use as electrophotographic materials, thermosensitive materials, sublimation transfer materials, thermal transfer materials, heat-developable materials, silver salt photographic materials and inkjet recording materials.

Image Recording Method

The image recording method of the present invention comprises, in a first mode, an image recording step of recording images by heating a thermosensitive recording material comprising the support for image recording material of the present invention and at least a thermosensitive recording layer formed on the support using any of a thermal head and laser, and further comprises the other step, if necessary.

The image recording step is not specifically limited, except for using, as the thermosensitive recording material, a thermosensitive recording material comprising the support for image recording material of the present invention and at least a thermosensitive recording layer formed on the support, and can be appropriately selected from known thermosensitive recording systems according to the purposes.

The thermal head may be appropriately selected according to the purposes and is preferably, for example, an area type thermal head in which plural heat-generating elements are arranged lengthwise and crosswise in a predetermined area, a line type thermal head in which plural heat-generating elements are arranged lengthwise or the like.

The laser may be appropriately selected according to the purposes, and examples of laser light to be used include direct laser light, for example, gas laser light such as argon ion laser light, helium neon laser light or helium cadmium laser light; solid laser light such as YAG laser light; semiconductor laser light; pigment laser light; and excimer laser light.

The heating temperature may be appropriately selected according to the purposes.

The image recording method of the present invention comprises, in a second mode, a latent image recording step and a heat-developing step, and further comprises the other step, if necessary.

The latent image recording step is a step of recording latent images by printing exposure of a thermal transfer material comprising the support for image recording material of the present invention and at least an image recording layer (for example, photosensitive thermosensitive recording layer, heat-developing photosensitive layer, etc.) formed on the support.

The heat-developing step is a step of forming visual images on the print-exposed heat-developable material by heating through a heating system using any one of a heating roller, a heating belt, a plate heater, a thermal head, laser and a combination thereof.

Heating may be selected according to the purposes, and is preferably performed at a temperature of 80° C. to 250° C.

The image recording method of the present invention comprises, in a third mode, a toner image forming step and a heat-fixing step, and further comprises the other step, if necessary.

The toner image forming step is a step of forming toner images on an electrophotographic material comprising the support for image recording material of the present invention and at least a toner receiving layer formed on the support.

The toner image forming step may be appropriately selected according to the purposes as long as it can form toner images on the electrophotographic material, and examples thereof include a method used in a conventional electrophotography, for example, a direct transfer system of transferring toner images formed on a developing roller onto an electrophotographic material, or an intermediate transfer belt system of transferring onto an electrophotographic material after primary transfer onto an intermediate transfer belt. Among these, an intermediate transfer belt system can be preferably used in view of environmental stability and high image quality.

The heat-fixing step is a step of fixing toner images formed by the toner image forming step by heating using any one of a fixing roller, a fixing belt and a combination thereof.

Heating is may be appropriately selected according to the purposes, and is preferably performed at a temperature of 80° C. to 200° C.

The image recording method of the present invention comprises, in a fourth mode, a toner image forming step and an image surface smoothing/fixing step, and further comprises the other step, if necessary.

The toner image forming step is the same as that in the third mode.

The image surface smoothing/fixing step is a step of smoothing the surface of toner images formed by the toner image forming step. In the image surface smoothing/fixing step, the toner images are heated, pressurized, cooled and then released using a device for image surface smoothing/fixing treatment, comprising a heating/pressurizing member, a belt member and a cooling device.

The device for image surface smoothing/fixing treatment comprises a heating/pressurizing member, a belt member and a cooling device, and is also equipped with a cooling release portion and the other members, if necessary.

The heating/pressurizing member may be appropriately selected according to the purposes, and examples thereof include a pair of heating rollers, and a combination of a heating roller and a pressure roller.

The cooling device may be appropriately selected according to the purposes and, for example, there can be employed a cooling device or heat sink capable of sending a cool air and adjusting a cooling temperature.

The cooling release portion may be appropriately selected according to the purposes and includes, for example, the position in the vicinity of a tension roll, at which the electrophotographic material is released from the belt due to rigidity (nerve) itself.

In case the toner images are brought into contact with the heating/pressurizing member of the device for image surface smoothing/fixing treatment, pressure is preferably applied. The method of applying a pressure may be appropriately selected according to the purposes, but a nip pressure is preferably employed. The nip pressure is preferably from 1 to 100 kg/cm$^2$, and more preferably from 5 to 30 kgf/cm$^2$, in view of forming images which are excellent in water resistance and surface smoothness and also have good gloss. The heating temperature in the heating/pressurizing member is a temperature higher than a softening point of the polymer for the toner receiving layer, and varies depending on the type of the polymer for the toner receiving layer, and is preferably from 80° C. to 200° C. The cooling temperature in the cooling device is preferably at a temperature of 80° C. or lower at which the toner receiving layer is sufficiently solidified, and is more preferably from 20° C. to 80° C.

The belt member comprises a heat resistant support film and a release layer formed on the support film.

The material of the support film may be appropriately selected according to the purposes as long as it has heat resistance, and examples thereof include polyimide (PI), polyethylene naphthalate (PEN), polyethylene terephthalate (PET), polyether ether ketone (PEEK), polyether sulfone (PES), polyetherimide (PEI) and polyparabanic acid (PPA).

The release layer preferably contains at least one selected from silicone rubber, fluororubber, fluorocarbonsiloxane rubber, silicone resin and fluororesin. Preferable aspect is an aspect in which a fluorocarbonsiloxane rubber-containing layer is formed on the surface of the belt member, or an aspect in which a silicone rubber-containing layer is formed on the surface of the belt member and also a fluorocarbonsiloxane rubber-containing layer is formed on the surface of the silicone rubber-containing layer.

The fluorocarbonsiloxane rubber preferably has at least a perfluoroalkylether group or a perfluoroalkyl group in the main chain.

The fluorocarbonsiloxane rubber is preferably a cured article of a fluorocarbonsiloxane rubber composition containing the following components (A) to (D):

(A) a fluorocarbon polymer which contains fluorocarbonsiloxane of the following General Formula (1) as a main component and also has an aliphatic unsaturated group, (B) at least organopolysiloxane or fluorocarbonsiloxane having two or more ≡SiH groups in a molecule in which the content of the ≡SiH group is 1 to 4 times larger than that of an aliphatic unsaturated group in the fluorocarbonsiloxane rubber composition, (C) a filler, and (D) an effective amount of catalyst.

The fluorocarbonpolymer as the component (A) contains fluorocarbonsiloxane having a repeating unit represented by the following General Formula (1) as a main component, and also has an aliphatic unsaturated group.

General Formula (1)

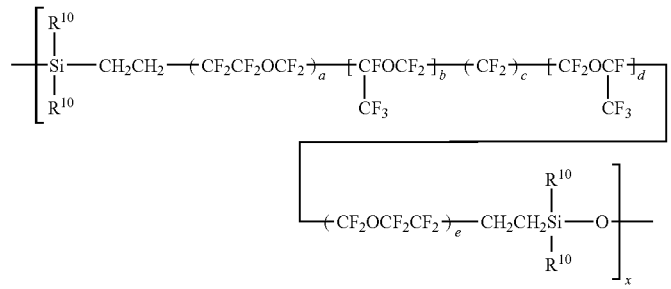

In the General Formula (1), R' is a unsubstituted or substituted monovalent hydrocarbon group having 1 to 8 carbon atoms, preferably an alkyl group having 1 to 8 carbon atoms or an alkenyl group having 2 to 3 carbon atoms, and particularly preferably a methyl group; "a" and "e" each represents an integer of 0 or 1; "b" and "d" each represents an integer of 1 to 4; "c" represents an integer of 0 to 8; X is preferably 1 or more, and more preferably from 10 to 30.

Examples of the component (A) include those represented by the following General Formula (2).

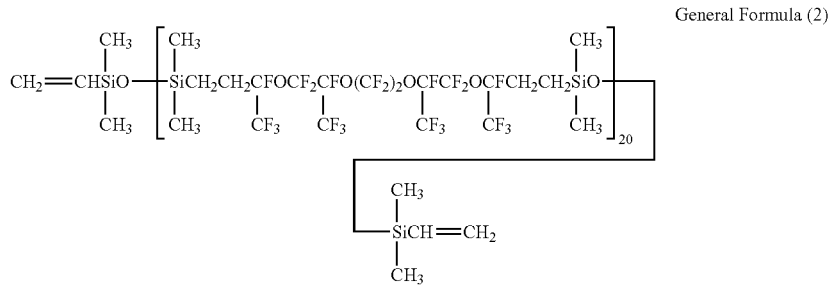

General Formula (2)

In the component (B), the organopolysiloxane having a≡SiH group includes organohydrogenpolysiloxane having at least two hydrogen atoms bonded to a silicon atom in the molecule.

In the fluorocarbonsiloxane rubber composition, when the fluorocarbon polymer as the component (A) has an aliphatic unsaturated group, the above-mentioned organohydrogen polysiloxane is preferably used as a curing agent. That is, a cured article is formed by the addition reaction which arises between the aliphatic unsaturated group in the fluorocarbonsiloxane, and hydrogen atoms bonded with the silicon atom in the organohydrogen polysiloxane.

As the organohydrogen polysiloxane, various organohydrogen polysiloxanes used in an addition-curable silicone rubber composition can be used.

In the organohydrogen polysiloxane, the number of the ≡SiH group is preferably at least, and particularly preferably from 1 to 5, per one aliphatic unsaturated hydrocarbon group in the fluorocarbonsiloxane as the component (A).

The fluorocarbon having a ≡SiH group is preferably fluorocarbon of the unit of the General Formula (1), or fluorocarbon of the General Formula (1) in which $R^{10}$ is a dialkylhydrogensiloxy group and a ≡SiH group such as dialkylhydrogenhydroxy group or silyl group is present at the end, and includes fluorocarbon represented by the following General Formula (3).

lacetonate. It is preferred to dissolve these complexes in an alcohol-based solvent, an ether-based solvent or a hydrocarbon solvent.

The fluorocarbon siloxane rubber composition may be appropriately selected according to the purposes and may contain various additives. For example, dispersing agents such as diphenylsilane diol, low polymer chain end hydroxyl group-blocked dimethylpolysiloxane and hexamethyl disilazane; heat resistance improvers such as ferrous oxide, ferric oxide, cerium oxide and octyl acid iron; and colorants such as pigments may be added as a compounding agent, if necessary.

The fixing belt is obtained by coating the surface of a heat resistant support film with the fluorocarbon siloxane rubber composition, followed by curing with heating. The composition may be diluted to form a coating solution with a solvent such as m-xylene hexafluoride or benzotrifluoride. The heat curing temperature and time can be suitably selected. The heat curing temperature and time can be suitably selected within a range from 100° C. to 500° C. and 5 seconds to 5 hours, according to the type of the support film and production method.

The thickness of the releasing layer formed on the surface of the heat resistance support film is not specifically limited. The thickness is preferably from 1 μm to 200 μm, and more

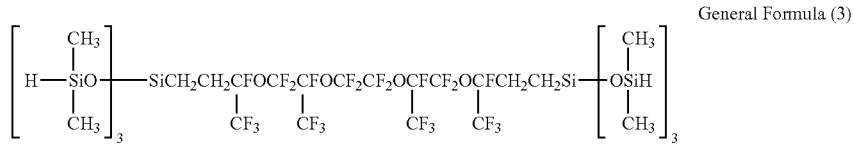

General Formula (3)

The filler as a component (C) may be various fillers used in ordinary silicone rubber compositions. Examples of the filler include reinforcing fillers such as mist silica, precipitated silica, carbon powder, titanium dioxide, aluminum oxide, quartz powder, talc, sericite and bentonite; and fiber fillers such as asbestos, glass fiber and organic fiber.

Examples of the catalyst as a component (D) include those any known as an addition reaction catalyst in the art. Specific examples of the catalyst include chloroplatinic acid, alcohol-modified chloroplatinic acid, complexes of chloroplatinic acid and olefins, platinum black or palladium supported on a carrier such as alumina, silica or carbon, and Group VIII elements of the Periodic Table or compounds thereof such as complexes of rhodium and olefins, chlorotris(triphenylphosphine) rhodium (Wilkinson catalyst) and rhodium (III) acetypreferably from 5 μm to 150 μm, so as to obtain good fixing properties for an image with preventing toner separation and offset of the toner.

An example of the device for image surface smoothing/fixing treatment in an image forming apparatus of the present invention will now be described in detail with reference to FIG. 1.

First, a toner 12 is transferred onto an electrophotographic material 1 in an image forming apparatus (not shown). The electrophotographic material 1, on which the toner 12 adhered, is transported to the point A using a transport equipment (not shown) and then passed through between a heating roller 14 and a pressure roller 15, thereby heating at the temperature (fixation temperature) at which a toner receiving layer or the toner 12 of the electrophotographic material 1 is sufficiently softened under pressure.

As used herein, the fixation temperature means a temperature of the surface of toner receiving layer measured at the heating roller 14, the pressure roller 15 and the nip portion at the point A and, for example its is preferably from 80° C. to 190° C., and more preferably from 100° C. to 170° C. The pressure means a pressure of the surface of toner receiving layer measured at the heating roller 14, the pressure roller 15 and the nip portion and, for example, it is preferably from 1 to 10 kgf/cm$^2$, and more preferably from 2 to 7 kgf/cm$^2$.

While the electrophotographic material 1 is transported to a cooling device 16 through a fixing belt 13 after applying heat and pressure, a releasing agent (not shown) existed discretely in the toner receiving layer is fused by sufficiently heating and moves onto the surface of the toner receiving layer. The moved releasing agent forms a layer (film) of the releasing agent on the surface of the toner receiving layer. Then, the electrophotographic material 1 is transported to the cooling device 16 through the fixing belt 13, where the electrophotographic material is cooled to the temperature, for example, a temperature of a softening point or lower or a glass transition point +10° C. or lower of a binder resin used in any of a polymer and a toner of the toner receiving layer of polymer and toner, preferably 20° C. to 80° C., and more preferably room temperature (25° C.). Thus, the layer (film) of the releasing agent formed on the surface of the toner receiving layer is cooled and solidified to form a releasing agent layer.

The cooled electrophotographic material 1 is further transported to the point B through the fixing belt 13 and the fixing belt 13 moves on a tension roller 17. Therefore, the electrophotographic material 1 is released from the fixing belt 13 at the point B. It is preferable to set the diameter of the tension roller so that the electrophotographic material is released from the belt due to rigidity (nerve) itself.

Figure 3:
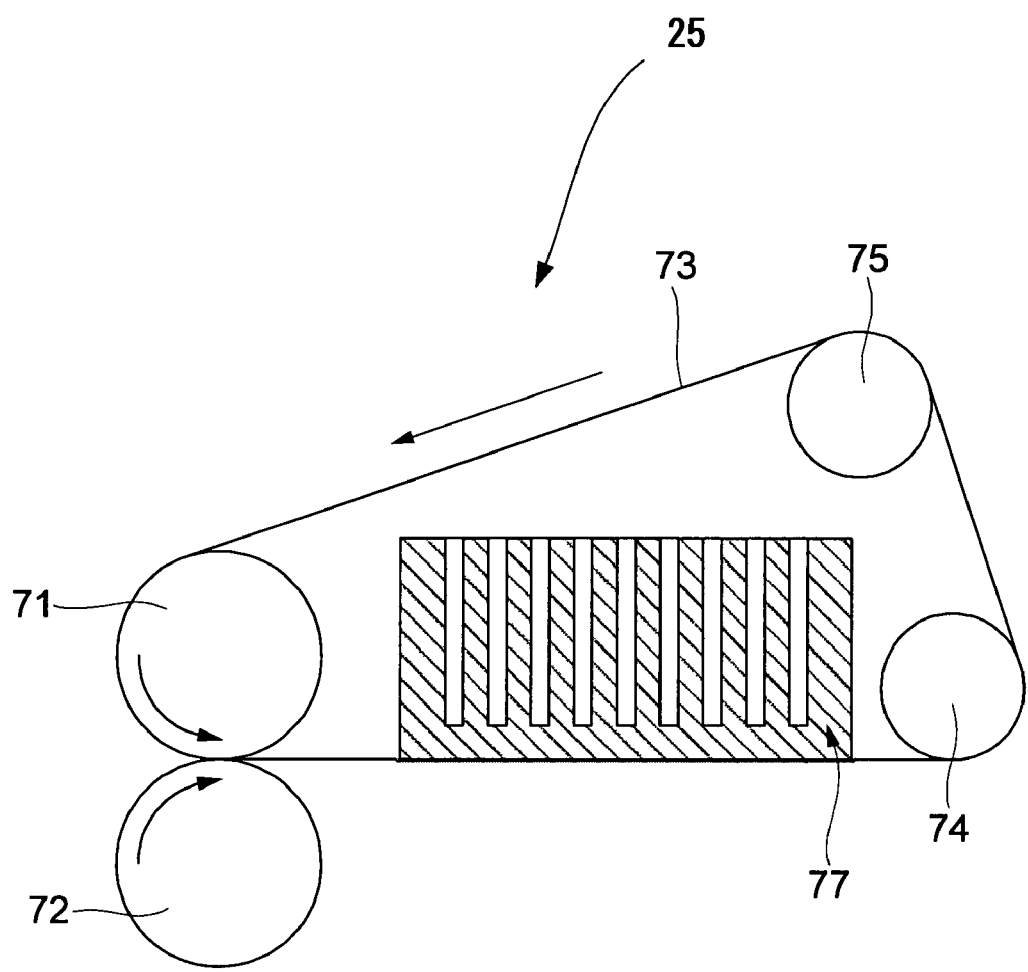
FIG. 3 is a schematic view showing an example of the device for image surface smoothing/fixing treatment in FIG. 2.

Also, the device for image surface smoothing/fixing treatment as shown in FIG. 3 can be modified and used as a fixing unit for the electrophotographic apparatus as shown in FIG. 2 (for example, a full color laser printer (DCC-500, manufactured by Fuji Xerox Co., Ltd.).

In FIG. 2, the symbol 200 denotes an image forming apparatus, 37 denotes a photoconductor drum, 19 denotes a processor, 31 denotes an intermediate transfer belt, 18 denotes an electrophotographic material and 25 denotes a fixation portion (device for image surface smoothing/fixing treatment), respectively.

FIG. 3 shows a fixed portion (device for image surface smoothing/fixing treatment) 25 which is disposed in the image forming apparatus 200 shown in FIG. 2.

As shown in FIG. 3, this device for image surface smoothing/fixing treatment 25 is equipped with a heating roller 71, a release roller 74 including the heating roller 71, an endless belt 73 supported rotatably by a tension roller 75, and a heating roller 72 which is close contact with the heating roller 71 through the endless belt 73.

In the inside of the endless belt 73, cooling heat sink 77 for forcibly cooling the endless belt 73 is disposed between the heating roller 71 and the release roller 74, and a cooling and heat transporting portion, which cools the electrophotographic material and transports a sheet, is composed of the cooling heat sink 77.

As shown in FIG. 3, in the device for image surface smoothing/fixing treatment 25, an electrophotographic transfer sheet, on which color toner images are transferred and fixed, is introduced into the pressure bonding portion (nip portion) of the heating roller 71 and the heating roller 72 which is in close contact with the heating roller 71 through the endless belt 73 so that color toner images are located at the side of heating roller 71, and then the color toner images are thermally fused and fixed on the electrophotographic material while passing through the close contact portion of the heating roller 71 and the heating roller 72.

Then, at the close contact portion of the heating roller 71 and the heating roller 72, the toner is substantially heated to the temperature of about 120° C. to 130° C. and fused, and the electrophotographic material in which color toner images are fixed on the toner receiving layer is transported, together with the endless belt on the surface is contacted with the surface of the endless belt 73. During transporting, the endless belt 73 is forcibly cooled by the cooling heat sink 77 and the color toner images and toner receiving layer are cooled and solidified, and then the electrophotographic material is released by the release roller 74 due to rigidity (nerve) itself.

After the completion of the peeling step, the residual toner is removed from the surface of the endless belt 73 by a cleaner (not shown) and is ready for the following step of image surface smoothing/fixing treatment.

According to the image recording method of the present invention, by using the electrophotographic material comprising the support for image recording material of the present invention, it is possible to form high quality images without causing blister, unevenness of recording and unevenness of fixation.

According to the present invention, it is possible to solve conventional problems and to provide a support for image recording material, which can record high quality images without causing blister, unevenness of recording and unevenness of fixation, and to provide an image recording material capable of recording high quality images using the support for image recording material.

EXAMPLES

Examples of the present invention will now be described, but the present invention is not limited to the following Examples.

Example 1

Production of Support for Image Recording Material

A broadleaf kraft pulp (LBKP) was beaten to 340 ml (Canadian standard freeness, C.S.F.) by a conical refiner to obtain a pulp having an average fiber length of 0.63 mm.

To 100 parts by mass of the pulp, 3 parts by mass of a water swellable sodium carboxymethylcellulose (etherification degree: 0.15, average particle size: 20 μm) was added, followed by dispersion with mixing.

Based on the mass of pulp, added were 1.0% by mass of cationic starch, 0.5% by mass of alkylketene dimer (AKD)) as a sizing agent, 0.2% by mass of anion polyacrylamide and 0.3% by mass of polyamide polyamine epichlorohydrin. In the alkyl ketene dimer, the alkyl moiety is derived from fatty acids mainly containing behenic acid.

A base paper of basis weight of 160 g/m$^2$ was manufactured from the pulp paper material obtained using a Fortlinear paper machine.

1.2 g/m$^2$ of polyvinyl alcohol and 0.7 g/m$^2$ of CaCl$_2$ were adhered to the front surface (surface of image recording side) of the base paper using a size press device in the middle of the drying zone of the Fortlinear paper machine.

In the last step of the paper-making process, the density was adjusted to 0.98 g/cm$^3$ by a soft calendar (the side of image recording surface (front surface): surface temperature of the metallic roller of 120° C., rear surface: surface temperature of the resin roller of 50° C.).

The side (front surface) of the image recording surface of the base paper was subjected to a corona discharge treatment and a polyethylene composition of a low density polyethylene resin (LDPE) containing 15% by mass of titanium dioxide and a high density polyethylene resin (HDPE) in a mixing ratio of 2/8 (mass ratio) as a first polymer coating layer (lower layer) having a thickness of 10 μm and LDPE containing 15% by mass of titanium dioxide as a second polymer coating layer (upper layer) having a thickness of 20 μm were coextruded in a molten two-layer state using the above coextruder.

On the other hand, the rear surface of the base paper was subjected to corona discharge treatment and a rear surface polyolefin resin layer having a thickness of 30 μm made of LDPE containing 15% by mass of titanium dioxide was formed by melt extrusion coating.

Subsequently, an undercoat layer made of gelatin was formed on the front surface polyethylene resin layer in a coating weight of 0.1 g/m². Thus, a support for image recording material of Example 1 was produced.

Examples 2 to 5 and Comparative Examples 1 to 4

Production of Support for Image Recording Material

In the same manner as in Example 1, except that the first polymer coating layer (lower layer) and the second polymer coating layer (upper layer) were changed as shown in Table 2, supports for image recording material of Examples 2 to 5, and Comparative Examples 1 to 4 were produced.

In Comparative Example 1 and Comparative Example 2, the polymer coating layer is a polymer coating layer with a single layer configuration which comprises no second polymer coating layer (upper layer).

Titanium Dioxide Dispersion Solution 40.0 g of titanium dioxide (TIPAQUE® A-220, manufactured by ISHIHARA SANGYO KAISHA, LTD.), 2.0 g of polyvinyl alcohol (PV A102, manufactured by KURARAY CO., LTD.), 58.0 g of ion-exchange water were mixed and then dispersed by NBK-2 manufactured by NIHONSEIKI KAISHA LTD. to obtain a titanium dioxide dispersion solution (the content of titanium dioxide pigment is 40% by mass).

Preparation of Coating Solution for Toner Receiving Layer 15.5 g of the titanium dioxide dispersion solution, 15.0 g of a carnauba wax dispersion solution (Cellozol 524, manufactured by CHUKYO YUSHI CO., LTD.), 100.0 g of a polyester resin water dispersion (solid content: 30% by mass, KZA-7049, manufactured by UNITIKA, LTD.), 2.0 g of a thickener (ALKOX1730, manufactured by Meisei Chemical Works, Ltd.), 0.5 g of an anionic surfactant (AOT) and 80 ml of ion-exchange water were mixed and stirred to prepare a coating solution for toner receiving layer.

The resulting coating solution for toner receiving layer showed a viscosity of 40 mPa·s and a surface tension of 34 mN/m.

Preparation of Coating Solution for Backing Layer 100.0 g of an acrylic resin water dispersion (solid content: 30% by mass, Hi-Ros XBH-997L, manufactured by Seiko Chemical Co,. Ltd.), 5.0 g of a matting agent (Techpomer MBX-12, manufactured by SEKISUI PLASTICS CO., LTD.), 10.0 g of a releasing agent (Hydrin D337, manufactured by CHUKYO YUSHI CO., LTD.), 2.0 g of a thickener (CMC), 0.59 g of an anionic surfactant (AOT) and 80 ml of ion-exchange water were mixed and stirred to prepare a coating solution for backing layer.

TABLE 2

| | First layer (Lower layer) | | | | Second layer (Upper layer) | | | |
|---|---|---|---|---|---|---|---|---|
| | LDPE (mass %) | HDPE (mass %) | Average density (g/cm³) | Thickness (μm) | LDPE (mass %) | HDPE (mass %) | Average density (g/cm³) | Thickness (μm) |
| Ex. 1 | 20% | 80% | 0.959 | 10 | 100% | 0% | 0.924 | 20 |
| Ex. 2 | 20% | 80% | 0.959 | 15 | 100% | 0% | 0.924 | 15 |
| Ex. 3 | 20% | 80% | 0.959 | 20 | 100% | 0% | 0.924 | 10 |
| Ex. 4 | 70% | 30% | 0.937 | 10 | 100% | 0% | 0.924 | 20 |
| Ex. 5 | 70% | 30% | 0.937 | 15 | 100% | 0% | 0.924 | 15 |
| Ex. 6 | 70% | 30% | 0.937 | 20 | 100% | 0% | 0.924 | 10 |
| Ex. 7 | 90% | 10% | 0.928 | 15 | 100% | 0% | 0.924 | 15 |
| Ex. 8 | 90% | 10% | 0.928 | 20 | 100% | 0% | 0.924 | 20 |
| Com. Ex. 1 | 100% | 0% | 0.924 | 30 | | None | | |
| Com. Ex. 2 | 100% | 0% | 0.924 | 15 | 20% | 80% | 0.959 | 15 |
| Com. Ex. 3 | 70% | 30% | 0.937 | 30 | | None | | |
| Com. Ex. 4 | 20% | 80% | 0.959 | 30 | | None | | |

*LDPE: Low density polyethylene resin: MFR = 3.5 g/10 min, density = 0.924 g/cm³
*HDPE: Low density polyethylene resin: MFR = 15 g/10 min, density = 0.968 g/cm³

Examples 9 to 16 and Comparative Examples 5 to 8

Production of Electrophotographic Image Receiving Paper

Using each of the supports for image recording material of Examples 1 to 8 and Comparative Examples 1 to 4, electrophotographic image receiving papers of Examples 9 to 16 and Comparative Examples 5 to 8 were prepared by the following method.

The resulting coating solution for backing layer showed a viscosity of 35 mPa·s and a surface tension of 33 mN/m.

Coating of Backing Layer and Toner Receiving Layer

On the surface on which the toner receiving layer is not formed (rear surface) of each of supports for image recording material of Examples 1 to 5 and Comparative Examples 1 to 4, the coating solution for backing layer was coated using a bar coater to form a backing layer having a dry mass of 9 g/m².

On the front surface of each base paper, the coating solution for toner receiving layer was coated using a bar coater to form a toner receiving layer having a dry mass of 12 g/m². The content of the pigment in the toner receiving layer was 5% by mass based on the thermoplastic resin.

The backing layer and the toner receiving layer were on-line dried by hot air. In the drying operation, the dry air quantity and temperature were adjusted so that both of the backing layer and toner receiving layer are dried within 2 minutes after coating. The drying operation was terminated when the surface temperature of the coating reaches the temperature which is the same as the wet-bulb temperature of dry air.

After drying, a calendering treatment was performed. The calendering treatment was performed under the conditions of a nip pressure of 14.7 kN/cm² (15 kgf/cm²) using a gloss calendar in the state where a metallic roller is maintained at 40° C.

Image Formation

Each of the resulting electrophotographic image receiving paper was cut into an A4 size and image formation was performed using, as an image forming apparatus, a full color laser printer (DCC-500, manufactured by Fuji Xerox Co., Ltd.) a fixing unit of which is modified to a device for image surface smoothing/fixing treatment shown in FIG. 3, and then a fixing and smoothing treatment was performed under the following conditions.

Belt

Support of belt: polyimide (PI) film, width=50 cm, thickness=80 μm

Material of release layer of belt: SIFEL 610 (manufactured by Shin-Etsu Chemical Co., Ltd.) as a fluorocarbonsiloxane rubber precursor was cured by vulcanization to obtain a vulcanized fluorocarbonsiloxane rubber having a thickness of 50 μm.

Heating/Pressurizing Step

Temperature of heating roller: appropriately adjustable, optionally

Nip pressure: 130 N/cm²

Cooling Step

Cooling device: Heat sink length=80 mm

Transport speed: 53 mm/sec

With respect to the resulting electrophotographic prints, image quality, occurrence of defects due to poor conformability, and blister were evaluated. The results are shown in Table 3.

Image Quality

Image quality of the respective electrophotographic prints were visually observed and evaluated according to the following criteria.

Evaluation Criteria:
A: Very excellent (effective as high image quality recording material)
B: Excellent (effective as high image quality recording material)
C: Ordinary (allowable as high image quality recording material)
D: Poor (failing grade as high image quality recording material)

Evaluation of Occurrence of Defects (Edge Voids) Due to Poor Conformability

With respect to the respective electrophotographic prints, the degree of occurrence of defects (edge voids) due to poor conformability at fixation temperature of 25° C. was visually observed and evaluated according to the following criteria.

Evaluation Criteria:
A: no defects (edge voids) occur
B: defects (edge voids) slightly occur
C: defects (edge voids) occur
D: severe defects (edge voids) occur Evaluation of Blister With respect to the respective electrophotographic image receiving paper, the temperature of a fixing belt at which blister begins to occur during image formation was measured and blister was evaluated according to the following criteria.

Evaluation Criteria:
A: any blister does not occur, very excellent
B: no blister occurs, excellent
C: blister slightly occurs
D: severe blister occurs

TABLE 3

| | Image quality | Occurrence of defects (edge voids) | Blister Temperature | Evaluation |
|---|---|---|---|---|
| Ex. 9 | C | A | 125° C. | B |
| Ex. 10 | A | A | 140° C. | A |
| Ex. 11 | B | B | 140° C. | A |
| Ex. 12 | C | A | 125° C. | B |
| Ex. 13 | A | A | 135° C. | A |
| Ex. 14 | B | B | 140° C. | A |
| Ex. 15 | C | A | 125° C. | B |
| Ex. 16 | B | A | 130° C. | B |
| Com. Ex. 5 | D | A | 120° C. | D |
| Com. Ex. 6 | D | D | 120° C. | D |
| Com. Ex. 7 | D | D | 140° C. | A |
| Com. Ex. 8 | D | D | 140° C. | A |

INDUSTRIAL APPLICABILITY

The support for image recording material of the present invention can record high quality images without causing blister, unevenness of recording and unevenness of fixation, and can be used for applications such as various image recording materials, and the support can be particularly preferably used in electrophotographic materials, thermosensitive materials, sublimation transfer materials, thermal transfer materials, heat-developable materials, silver salt photographic materials and inkjet recording materials.

The image recording material of the present invention can be preferably used as electrophotographic materials, thermosensitive materials, sublimation transfer materials, thermal transfer materials, heat-developable materials, silver salt photographic materials and inkjet recording materials because the support for image recording material of the present invention is used.

The invention claimed is:

1. An image recording material, comprising:
    a support for image recording material comprising:
        a base paper; and
        at least one polyolefin resin layer on each of both surfaces of the base paper,
    wherein two or more of polyolefin resin layers are disposed at the front side of the support on which an image recording layer is to be formed,
    the average density of the outermost polyolefin resin layer at the front side is less than an average density of at least one of the two or more of polyolefin resin layers except for the outermost polyolefin resin layer, the average density of the outermost polyolefin resin layer at the front side is less than 0.930 g/cm$^3$ and the average density of at least one of the two or more of polyolefin resin layers except for the outermost polyolefin resin layer is 0.930 g/cm$^3$ or more, and the thickness of at least one of the two or more of polyolefin resin layers except for the outermost polyolefin resin layer is 15 μm or more, and an image recording layer formed on the support.

2. The image recording material according to claim 1, which is subjected to at least one of heat-recording, heat-development, and heat-fixation.

3. The image recording material according to claim 1, selected from electrophotographic materials, thermosensitive materials, sublimation transfer materials, thermal transfer materials, heat-developable materials, silver salt photographic materials, and inkjet recording materials.

* * * * *